US011905737B2

(12) United States Patent
Liang et al.

(10) Patent No.: US 11,905,737 B2
(45) Date of Patent: Feb. 20, 2024

(54) ELECTRIC LOCKS

(71) Applicant: Consumer 2.0 Inc., Los Angeles, CA (US)

(72) Inventors: Zhong Liang, Shenzhen (CN); Xuefeng Gu, Shenzhen (CN)

(73) Assignee: CONSUMER 2.0 INC., Los Angeles, CA (US)

( * ) Notice: Subject to any disclaimer, the term of this patent is extended or adjusted under 35 U.S.C. 154(b) by 129 days.

(21) Appl. No.: 17/449,086

(22) Filed: Sep. 27, 2021

(65) Prior Publication Data

US 2023/0051877 A1 Feb. 16, 2023

(30) Foreign Application Priority Data

Aug. 12, 2021 (CN) ......................... 202110923864.0
Aug. 12, 2021 (CN) ......................... 202121881831.6

(51) Int. Cl.
*E05B 47/00* (2006.01)

(52) U.S. Cl.
CPC .... *E05B 47/0012* (2013.01); *E05B 2047/002* (2013.01); *E05B 2047/003* (2013.01);
(Continued)

(58) Field of Classification Search
CPC ....... E05B 2047/002; E05B 2047/0026; E05B 2047/0027; E05B 2047/003;
(Continued)

(56) References Cited

U.S. PATENT DOCUMENTS

2004/0207214 A1* 10/2004 Lin ..................... E05B 47/0012 292/336.3
2010/0212381 A1* 8/2010 Huang .................. E05B 47/068 70/279.1

(Continued)

FOREIGN PATENT DOCUMENTS

CN 106761011 A * 5/2017 ......... E05B 47/0012
CN 206522018 U * 9/2017
CN 108798277 A 11/2018

*Primary Examiner* — Alyson M Merlino
(74) *Attorney, Agent, or Firm* — EAGLE IP LIMITED

(57) ABSTRACT

An exemplary embodiment provides an electric lock, comprising: (a) a knob; (b) a lock body; (c) a rotatable shaft comprising a rotatable-shaft front end and an opposing rotatable-shaft rear end, wherein the rotatable-shaft rear end is fixedly connected to the lock body to control a locking and unlocking of the lock body; (d) a gear assembly comprising a gear and a movable piece with a common axis center; and (e) a motor assembly for driving the gear to rotate. The knob and the rotatable shaft are connected via the movable piece; the movable piece interacts with the gear via a mechanical barrier, such that electrically driving the gear by the motor assembly causes the movable piece to rotate; and the movable piece can pass over the mechanical barrier when a sufficient rotational force is applied to the knob, such that the movable piece is free to rotate relative to the gear, thereby allowing a user to manually control the locking and unlocking of the lock body. In some exemplary embodiments, the provided design of the electric lock structure significantly improves the safety of the electric lock.

31 Claims, 17 Drawing Sheets

(52) U.S. Cl.
CPC ................. *E05B 2047/0017* (2013.01); *E05B 2047/0036* (2013.01); *E05B 2047/0067* (2013.01)

(58) Field of Classification Search
CPC ..... E05B 2047/0031; E05B 2047/0091; E05B 2047/0084; E05B 2047/0086; E05B 17/0054; E05B 17/044; E05B 17/045; E05B 17/046
See application file for complete search history.

(56) References Cited

U.S. PATENT DOCUMENTS

| | | | | |
|---|---|---|---|---|
| 2010/0257906 | A1 * | 10/2010 | Sorensen | E05B 47/068 70/91 |
| 2013/0167671 | A1 * | 7/2013 | Huang | E05B 47/068 74/25 |
| 2022/0162883 | A1 * | 5/2022 | Chen | E05B 47/0012 |
| 2023/0203844 | A1 * | 6/2023 | Xiong | E05B 47/0012 70/279.1 |

* cited by examiner

ELECTRIC LOCKS

CROSS-REFERENCE TO RELATED APPLICATION

This application claims priorities to, and the benefits of, Chinese Invention Patent Application No. filed on 202110923864.0 filed on 12 Aug. 2021 and Chinese Utility Model Patent Application No. 202121881831.6 filed on 12 Aug. 2021. The entire content of the foregoing applications is hereby incorporated by reference herein in its entirety.

FIELD OF INVENTION

The present disclosure relates to the field of locks, and in particular to electric locks.

BACKGROUND OF INVENTION

Methods for unlocking existing electric door locks are implemented mostly by using a motor gear box assembly to directly drive a rotatable shaft gear to perform locking and unlocking operations, and there is a drawback to such structures of the existing electric door locks. When a user uses a knob to manually lock or unlock the door lock, the user has to turn the knob with a great force to drive the entire motor gears to rotate altogether, resulting in the user being unable to quickly and easily lock or unlock a door, and therefore people with weaker strength such as children or elderly people may not be able to successfully unlock the door and escape in case of a locked rotor or a power failure halfway during unlocking the door, which greatly reduces the safety and practicability of the door lock.

SUMMARY OF INVENTION

In the light of the foregoing background, in some exemplary embodiments, one of the objectives is to provide an improved electric lock to solve the safety and practicability problem of existing electric door locks.

Therefore, according to one aspect, provided is an electric lock, comprising: (a) a knob; (b) a lock body; (c) a rotatable shaft comprising a rotatable-shaft front end and an opposing rotatable-shaft rear end, wherein the rotatable-shaft rear end is fixedly connected to the lock body to control a locking and unlocking of the lock body; (d) a gear assembly comprising a gear and a movable piece with a common axis center; and (e) a motor assembly for driving the gear to rotate. The knob and the rotatable shaft are connected via the movable piece; the movable piece interacts with the gear via a mechanical barrier, such that electrically driving the gear by the motor assembly causes the movable piece to rotate; and the movable piece can pass over the mechanical barrier when a sufficient rotational force is applied to the knob, such that the movable piece is free to rotate relative to the gear, thereby allowing a user to manually control the locking and unlocking of the lock body.

In another exemplary embodiment, provided is an electric lock, comprising: (a) a knob; (b) a lock body; (c) a rotatable shaft comprising a rotatable-shaft front end and an opposing rotatable-shaft rear end, wherein the rotatable-shaft rear end is fixedly connected to the lock body to control a locking and unlocking of the lock body; (d) a gear assembly comprising a gear and an inner core with a common axis center; and (e) a motor assembly for driving the gear to rotate. The gear comprises an internal wall that defines a gear internal space for accommodating the inner core, wherein the internal wall comprises at least one protrusion extending towards the axis center; the inner core is at least partially mounted in the gear internal space, wherein the inner core comprises an inner core opening arranged on the axis center and at least one ball head spring mechanism provided in the inner core, and the at least one ball head spring mechanism comprises a ball head extending away from the axis center and adjacent to the internal wall; the electric lock further comprises a connector comprising a connector front end, an opposing connector rear end, and a connector outer periphery sized and shaped to match the inner core opening, wherein the connector front end is connected to the knob, and the connector rear end passes through the inner core opening and is connected to the rotatable-shaft front end; wherein when the motor assembly drives the gear to rotate, the at least one protrusion interacts with the at least one ball head spring mechanism to drive the inner core and the rotatable shaft to rotate together, thereby electrically controlling the locking and unlocking of the lock body; and the at least one ball head spring mechanism can be compressed, such that when a sufficient rotational force is applied to the knob, the ball head passes over the at least one protrusion, so that the inner core is free to rotate relative to the gear, thereby allowing a user to manually control the locking and unlocking of the lock body.

In a further exemplary embodiment, an electric lock is provided, comprising: (a) a knob; (b) a lock body; (c) a rotatable shaft comprising a rotatable-shaft front end and an opposing rotatable-shaft rear end, wherein the rotatable-shaft rear end is fixedly connected to the lock body to control a locking and unlocking of the lock body; (d) a gear assembly comprising a gear and an inner core with a common axis center; and (e) a motor assembly for driving the gear to rotate, wherein the gear comprises an internal wall that defines a gear internal space for accommodating the inner core, wherein the internal wall comprises two protrusions extending towards the axis center; the inner core is at least partially mounted in the gear internal space, wherein the inner core comprises (i) an inner core opening arranged on the axis center; (ii) a first frame, wherein the first frame comprises: a first ball head disposed on the first frame, wherein the first ball head extends away from the axis center and abuts the internal wall; and a first arm and a second arm; (iii) a second frame, wherein the second frame and the first frame are symmetrically arranged on the inner core, the second frame comprises: a second ball head disposed on the second frame, wherein the second ball head extends away from the axis center and abuts the internal wall; and a third arm and a fourth arm; (iv) a first spring elastically connecting the first arm of the first frame to the third arm of the second frame; and (v) a second spring elastically connecting the second arm of the first frame to the fourth arm of the second frame; the electric lock further comprises a connector comprising a connector front end, an opposing connector rear end, and a connector outer periphery sized and shaped to match the inner core opening, wherein the connector front end is connected to the knob, and the connector rear end passes through the inner core opening and is connected to the rotatable-shaft front end; wherein when the motor assembly drives the gear to rotate, the two protrusions interact with the first frame and the second frame respectively to drive the inner core and the rotatable shaft to rotate together, thereby electrically controlling the locking and unlocking of the lock body; and the first spring and the second spring can be compressed, such that when a sufficient rotational force is applied to the knob, the first frame and the second frame approach each other so that the first ball head and the second ball head pass over one of the two protrusions respectively, so that the inner core is free to rotate relative to the gear, thereby allowing a user to manually control the locking and unlocking of the lock body.

Other exemplary embodiments are described herein.

The present disclosure has many advantages in various embodiments. In some embodiments, the inner core (also known as the movable piece) cooperates with the gear so that the locking and unlocking of the lock body of the electric lock can be controlled either electrically or manually, thereby allowing a user to easily operate the locking and unlocking of the electric lock to achieve a better user experience. In some embodiments, a lock with a free rotation mechanism is provided, which achieves a free rotation effect after electrically driving the locking and unlocking of the lock. In some embodiments, because the ball head spring mechanism of the inner core can be compressed, when a sufficient rotational force is applied to the knob, the ball head of the ball head spring mechanism passes over the protrusion of the gear, so that the inner core is free to rotate relative to the gear, thereby allowing a user to manually perform locking and unlocking operations without having to turn the knob with a great force. The design of the electric lock structure can prevent the user from being trapped indoors due to the inability to manually unlock the lock when power failure suddenly occurs halfway during electric locking or unlocking or a locked rotor during locking occurs, and the safety of the electric lock is significantly improved. In some embodiments, the circuit board can control the orientation of the gear and the rotatable shaft, so that a reverse rotation action can be performed after electrically controlled locking and unlocking of the lock body switch is completed, to allow the inner core to have a certain range of rotation angle relative to the gear without having to pass over the protrusions of the gear, so as to facilitate manual control over the locking and unlocking of the lock body by the user.

DETAILED DESCRIPTION OF THE PREFERRED EMBODIMENTS

Figure 1A:
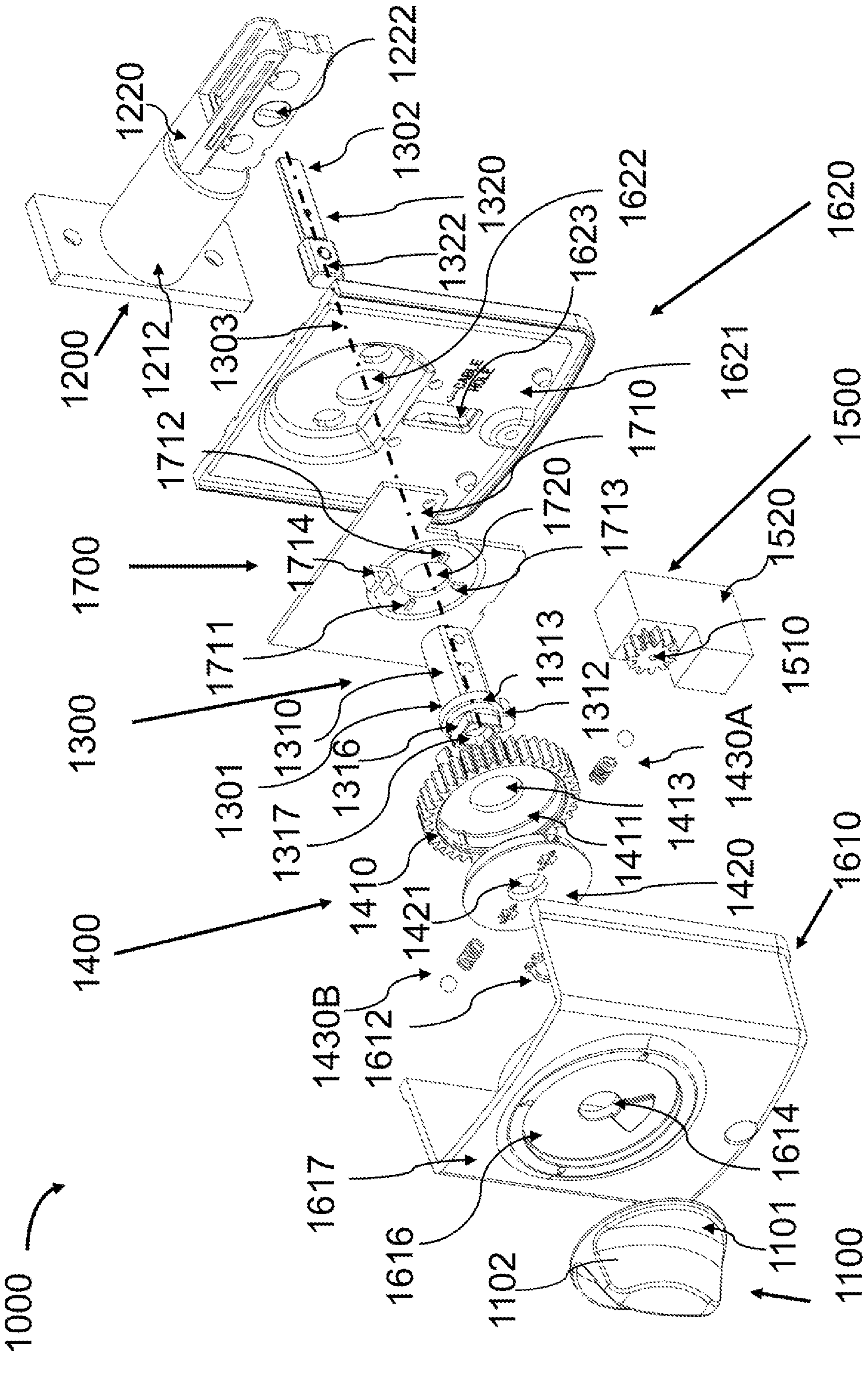
FIG. 1A is an exploded view of the structure of an electric lock according to an exemplary embodiment.

As used herein and in the claims, "comprising" means including the following elements, but not excluding other elements.

As used herein and in the claims, "connect" or "connecting" refers to direct or indirect physical joining of one component to another component.

As used herein and in the claims, "interact" or "interaction" refers to a physical interactive relationship between one component and another component, wherein when one component abuts another component, the one component will drive the another component to move together. In some embodiments, the interaction between a protrusion and a ball head spring mechanism means that when the protrusion abuts the ball head spring mechanism, the protrusion will drive the ball head spring mechanism to move together in the same direction, thereby driving an inner core and a rotatable shaft to rotate together.

As used herein and in the claims, the terms "substantial", "substantially", "general", "generally", "approximately", and "about" mean that the recited characteristic, angle, shape, state, structure or value needs not be precisely achieved, but that deviations or variations, including for example, tolerances, measurement error, measurement accuracy limitations and other factors known to those of skill in the art, may occur in amounts that do not preclude the effect the characteristic was intended to provide. For example, an object "substantially" perpendicular to an axis, line or surface would mean that the object is either exactly perpendicular to the axis, line or surface or nearly exactly perpendicular to the axis, line or surface, for example, having a deviation of 5%.

As used herein and in the claims, "electric lock" refers to a lock bolt device which can rely on a motor for locking and unlocking. In some embodiments, the locking and unlocking of the electric lock may be electrically controlled by a motor, or may be manually controlled by a user. In some embodiments, the electric lock can be installed on a door as a door lock for locking and unlocking the door.

As used herein and in the claims, "mechanical barrier" refers to any physical structure capable of limiting or obstructing the passage of a component thereover, such as a stopper, a protrusion, a ridge, a bump, a bulge, or an obstacle in any other form.

As used herein and in the claims, "ball head spring mechanism" or "rounded head spring mechanism" refers to an element with an elastic force that has a ball head at one end. In an embodiment, the ball head spring mechanism or rounded head spring mechanism is composed of a spring and a bead. In some other embodiments, the ball head spring mechanism or rounded head spring mechanism may be composed of multiple different components, or composed of an integral component. For example, the ball head spring mechanism or rounded head spring mechanism may comprise any element with an elastic force other than a spring, including but not limited to an elastic band, a rubber band, and elastic glue. For example, the ball head spring mechanism or rounded head spring mechanism may comprise any element with a ball head other than a bead, including but not limited to a bullet head, a round head cylinder, or a round head screw.

As used herein and in the claims, "ball head" or "rounded head" refers to a component in a ball head spring mechanism, a rounded head spring mechanism, or a frame, and the component comprises an end face, wherein the end face has a radian. In some embodiments, the "ball head" or "rounded head" may be a bead. In some other embodiments, the "ball head" or "rounded head" may be a protruding member, which has a radian only on the end face, while other parts may have other shapes.

It shall be understood by one of skill in the art that structures such as protrusions, recesses, protruding portions, openings and housings may have various shapes and sizes.

It will be understood that although the terms such as "first", "second" and "third" may be used herein to describe various limitations, elements, components, areas, portions, and/or sections, these limitations, elements, components, areas, portions and/or sections should not be limited by these terms. These terms are used merely to distinguish one limitation, element, component, area, portion or section from another limitation, element, component, area, portion or section. Thus, a first limitation, element, component, area, portion or section discussed below may be referred to as a second limitation, element, component, area, portion or section without departing from the teachings of the present disclosure.

It will be further understood that, terms such as "front", "rear", "front face", "rear face", "top", "bottom", "left", "right", "side face", "length", "width", "inner", "outer", "internal", "external", "transverse", "vertical", "horizontal" and the like as may be used herein, are merely used to describe reference points for ease of description, and therefore, the exemplary embodiments will not be limited to any particular orientation or configuration.

An embodiment of the present disclosure provides an electric lock, comprising: (a) a knob; (b) a lock body; (c) a rotatable shaft comprising a rotatable-shaft front end and an opposing rotatable-shaft rear end, wherein the rotatable-shaft rear end is fixedly connected to the lock body to control a locking and unlocking of the lock body; (d) a gear assembly comprising a gear and a movable piece with a common axis center; and (e) a motor assembly for driving the gear to rotate. The knob and the rotatable shaft are connected via the movable piece; the movable piece interacts with the gear via a mechanical barrier, such that electrically driving the gear by the motor assembly causes the movable piece to rotate; and the movable piece can pass over the mechanical barrier when a sufficient rotational force is applied to the knob, such that the movable piece is free to rotate relative to the gear, thereby allowing a user to manually control the locking and unlocking of the lock body.

In an embodiment, the gear comprises an internal wall that defines a gear internal space for accommodating the movable piece, wherein the mechanical barrier comprises at least one protrusion extending from the internal wall towards the axis center; the movable piece comprises at least one ball head spring mechanism, and the at least one ball head spring mechanism comprises a ball head extending away from the axis center and adjacent to the internal wall; and the at least one ball head spring mechanism can be compressed, such that when a sufficient rotational force is applied to the knob, the ball head passes over the at least one protrusion.

In an embodiment, the movable piece comprises at least one recess arranged on the movable piece and configured to accommodate one of the at least one ball head spring mechanism.

In an embodiment, the at least one protrusion is two protrusions symmetrically arranged on two opposite sides of the internal wall and extending towards the axis center; and the at least one ball head spring mechanism is two ball head spring mechanisms.

In an embodiment, the gear comprises an internal wall that defines a gear internal space for accommodating the movable piece, wherein the mechanical barrier comprises at least one protrusion extending from the internal wall towards the axis center; and the movable piece is at least partially mounted in the gear internal space, wherein the movable piece comprises at least two frames disposed therein, and each of the at least two frames comprises a ball head disposed thereon; wherein the ball head extends away from the axis center, and each of the at least two frames is elastically connected to an adjacent frame, such that the ball head abuts the internal wall, and when a sufficient rotational force is applied to the knob, the at least two frames approach each other, such that the ball head passes over the at least one protrusion.

In an embodiment, the ball head and the axis center define a radial axis therebetween; and the electric lock further comprises at least one restricting member, and the restricting member is configured to hold the frame and restrict the ball head to move along the radial axis.

In an embodiment, each of the at least two frames comprises at least one guide rail, which is configured to be placed juxtapose with the restricting member and restrict the frame to move along the guide rail.

In an embodiment, the at least two frames comprise: (i) a first frame, wherein the first frame comprises: a first ball head disposed on the first frame, wherein the first ball head extends away from the axis center and abuts the internal wall; and a first arm and a second arm; (ii) a second frame, wherein the second frame and the first frame are symmetrically arranged on the movable piece, the second frame comprises: a second ball head disposed on the second frame, wherein the second ball head extends away from the axis center and abuts the internal wall; and a third arm and a fourth arm; the movable piece further comprises: a first spring elastically connecting the first arm of the first frame to the third arm of the second frame; and a second spring elastically connecting the second arm of the first frame to the fourth arm of the second frame.

In an embodiment, the movable piece comprises a movable piece opening arranged on the axis center, wherein the gear comprises a gear opening arranged on the axis center, wherein a size of the gear opening is larger than that of the movable piece opening, so that when the knob is manually rotated, the knob drives the movable piece and the rotatable shaft to rotate independently of the gear.

In an embodiment, the motor assembly comprises a main gear meshing with the gear to drive the gear to rotate.

In an embodiment, the ball head is a bead, a bullet head, a round head cylinder, or a round head screw.

In an embodiment, the rotatable-shaft front end and the rotatable-shaft rear end define a longitudinal axis therebetween, and the rotatable-shaft front end comprises a protruding portion extending substantially perpendicular to the longitudinal axis and away from the rotatable shaft, the protruding portion comprises a magnet disposed thereon; and the electric lock further comprises a circuit board electrically connected to the motor assembly, the circuit board is arranged substantially perpendicular to the longitudinal axis and comprises a circuit board opening to allow the rotatable-shaft rear end to pass through the circuit board opening so as to be fixedly connected to the lock body, and the circuit board further comprises a first sensor, a second sensor, and a third sensor for detecting the position of the magnet, such that the circuit board can determine and control the orientation of the rotatable shaft through the detected position of the magnet, thereby electrically controlling the locking and unlocking of the lock body.

In an embodiment, the gear further comprises a gear front face facing the knob and an opposing gear rear face, and a first baffle and a second baffle symmetrically arranged on the gear rear face; and the circuit board further comprises a fourth sensor for detecting the first baffle and the second baffle, such that the circuit board can determine and control the orientation of the gear through detected positions of the first baffle and the second baffle, thereby electrically controlling the rotation of the gear.

In an embodiment, the first sensor and the second sensor are symmetrically arranged on the circuit board with the circuit board opening as a center, wherein a line connecting the first sensor and the second sensor defines a first circuit board centerline; and the third sensor and the fourth sensor are symmetrically arranged on the circuit board with the circuit board opening as a center and aligned along a second circuit board centerline perpendicular to the first circuit board centerline.

In an embodiment, the electric lock further comprises a front cover and a rear cover, wherein the front cover is connected to the rear cover to form a housing and define a housing internal space therein, wherein the gear assembly, the motor assembly, the circuit board and at least part of the rotatable shaft are arranged within the housing internal space, and the knob and the lock body are arranged outside the housing internal space.

In an embodiment, the knob is mounted on the front cover and fixed by a circlip, and the circuit board is mounted on the rear cover and faces the housing internal space.

In an embodiment, the movable piece is free to rotate by 360° relative to the gear.

In another exemplary embodiment, an electric lock is provided, comprising: (a) a knob; (b) a lock body; (c) a rotatable shaft comprising a rotatable-shaft front end and an opposing rotatable-shaft rear end, wherein the rotatable-shaft rear end is fixedly connected to the lock body to control a locking and unlocking of the lock body; (d) a gear assembly comprising a gear and an inner core with a common axis center; and (e) a motor assembly for driving the gear to rotate. The gear comprises an internal wall that defines a gear internal space for accommodating the inner core, wherein the internal wall comprises at least one protrusion extending towards the axis center; the inner core is at least partially mounted in the gear internal space, wherein the inner core comprises an inner core opening arranged on the axis center and at least one ball head spring mechanism provided in the inner core, and the at least one ball head spring mechanism comprises a ball head extending away from the axis center and adjacent to the internal wall; the electric lock further comprises a connector comprising a connector front end, an opposing connector rear end, and a connector outer periphery sized and shaped to match the inner core opening, wherein the connector front end is connected to the knob, and the connector rear end passes through the inner core opening and is connected to the rotatable-shaft front end; wherein when the motor assembly drives the gear to rotate, the at least one protrusion interacts with the at least one ball head spring mechanism to drive the inner core and the rotatable shaft to rotate together, thereby electrically controlling the locking and unlocking of the lock body; and the at least one ball head spring mechanism can be compressed, such that when a sufficient rotational force is applied to the knob, the ball head passes over the at least one protrusion, so that the inner core is free to rotate relative to the gear, thereby allowing a user to manually control the locking and unlocking of the lock body.

In an embodiment, the inner core comprises at least one recess arranged on the inner core and configured to accommodate one of the at least one ball head spring mechanism.

In an embodiment, the gear comprises a gear opening arranged on the axis center, wherein a size of the gear opening is larger than that of the inner core opening, so that when the knob is manually rotated, the knob drives the inner core and the rotatable shaft to rotate independently of the gear.

In an embodiment, the motor assembly comprises a main gear meshing with the gear to drive the gear to rotate.

In an embodiment, the at least one protrusion is two protrusions symmetrically arranged on two opposite sides of the internal wall and extending towards the axis center; and the at least one ball head spring mechanism is two ball head spring mechanisms.

In an embodiment, each of the ball heads of the ball head spring mechanisms is a bead, a bullet head, a round head cylinder, or a round head screw.

In an embodiment, the rotatable-shaft front end and the rotatable-shaft rear end define a longitudinal axis therebetween, and the rotatable-shaft front end comprises a protruding portion extending substantially perpendicular to the longitudinal axis and away from the rotatable shaft, the protruding portion comprises a magnet disposed thereon; and the electric lock further comprises a circuit board electrically connected to the motor assembly, the circuit board is arranged substantially perpendicular to the longitudinal axis and comprises a circuit board opening to allow the rotatable-shaft rear end to pass through the circuit board opening so as to be fixedly connected to the lock body, and the circuit board further comprises a first sensor, a second sensor, and a third sensor for detecting the position of the magnet, such that the circuit board can determine and control the orientation of the rotatable shaft through the detected position of the magnet, thereby electrically controlling the locking and unlocking of the lock body.

In an embodiment, the gear further comprises a gear front face facing the knob and an opposing gear rear face, and a first baffle and a second baffle symmetrically arranged on the gear rear face; and the circuit board further comprises a fourth sensor for detecting the first baffle and the second baffle, such that the circuit board can determine and control the orientation of the gear through detected positions of the first baffle and the second baffle, thereby electrically controlling the rotation of the gear.

In an embodiment, the first sensor and the second sensor are symmetrically arranged on the circuit board with the circuit board opening as a center, wherein a line connecting the first sensor and the second sensor defines a first circuit board centerline; and the third sensor and the fourth sensor are symmetrically arranged on the circuit board with the circuit board opening as a center and aligned along a second circuit board centerline perpendicular to the first circuit board centerline.

In an embodiment, the electric lock further comprises a front cover and a rear cover, wherein the front cover is connected to the rear cover to form a housing and define a housing internal space therein, wherein the gear assembly, the motor assembly, the circuit board and at least part of the rotatable shaft are arranged within the housing internal space, and the knob and the lock body are arranged outside the housing internal space.

In an embodiment, the knob is mounted on the front cover and fixed by a circlip, and the circuit board is mounted on the rear cover and faces the housing internal space.

In an embodiment, the inner core is free to rotate by 360° relative to the gear.

In an exemplary embodiment, an electric lock is provided, comprising: (a) a knob; (b) a lock body; (c) a rotatable shaft comprising a rotatable-shaft front end and an opposing rotatable-shaft rear end, wherein the rotatable-shaft rear end is fixedly connected to the lock body to control a locking and unlocking of the lock body; (d) a gear assembly comprising a gear and an inner core with a common axis center; and (e) a motor assembly for driving the gear to rotate, wherein the gear comprises an internal wall that defines a gear internal space for accommodating the inner core, wherein the internal wall comprises two protrusions extending towards the axis center; the inner core is at least partially mounted in the gear internal space, wherein the inner core comprises (i) an inner core opening arranged on the axis center; (ii) a first frame, wherein the first frame comprises: a first ball head disposed on the first frame, wherein the first ball head extends away from the axis center and abuts the internal wall; and a first arm and a second arm; (iii) a second frame, wherein the second frame and the first frame are symmetrically arranged on the inner core, the second frame comprises: a second ball head disposed on the second frame, wherein the second ball head extends away from the axis center and abuts the internal wall; and a third arm and a fourth arm; (iv) a first spring elastically connecting the first arm of the first frame to the third arm of the second frame; and (v) a second spring elastically connecting the second arm of the first frame to the fourth arm of the second frame; the electric lock further comprises a connector comprising a connector front end, an opposing connector rear end, and a connector outer periphery sized and shaped to match the inner core opening, wherein the connector front end is connected to the knob, and the connector rear end passes through the inner core opening and is connected to the rotatable-shaft front end; wherein when the motor assembly drives the gear to rotate, the two protrusions interact with the first frame and the second frame respectively to drive the inner core and the rotatable shaft to rotate together, thereby electrically controlling the locking and unlocking of the lock body; and the first spring and the second spring can be compressed, such that when a sufficient rotational force is applied to the knob, the first frame and the second frame approach each other so that the first ball head and the second ball head pass over one of the two protrusions respectively, so that the inner core is free to rotate relative to the gear, thereby allowing a user to manually control the locking and unlocking of the lock body.

In an embodiment, the first ball head and the axis center define a first radial axis therebetween, and the second ball head and the axis center define a second radial axis therebetween; and the electric lock further comprises: a first restricting member and a second restricting member, configured to hold the first frame and restrict the first ball head to move along the first radial axis; and a third restricting member and a fourth restricting member, configured to hold the second frame and restrict the second ball head to move along the second radial axis.

In an embodiment, the first arm of the first frame comprises a first guide rail; the second arm of the first frame comprises a second guide rail; the third arm of the second frame comprises a third guide rail; the fourth arm of the second frame comprises a fourth guide rail; wherein the first restricting member and the second restricting member are placed juxtapose with the first guide rail and the second guide rail respectively and restrict the first frame to move along the first guide rail and the second guide rail respectively; and the third restricting member and the fourth restricting member are placed juxtapose with the third guide rail and the fourth guide rail respectively and restrict the second frame to move along the third guide rail and the fourth guide rail respectively.

The various aspects of the present invention are further described below with reference to the accompanying figures.

In the following description, the same reference numerals are used to describe the same components in different accompanying figures.

Electric Lock

Example 1

Figure 1B:
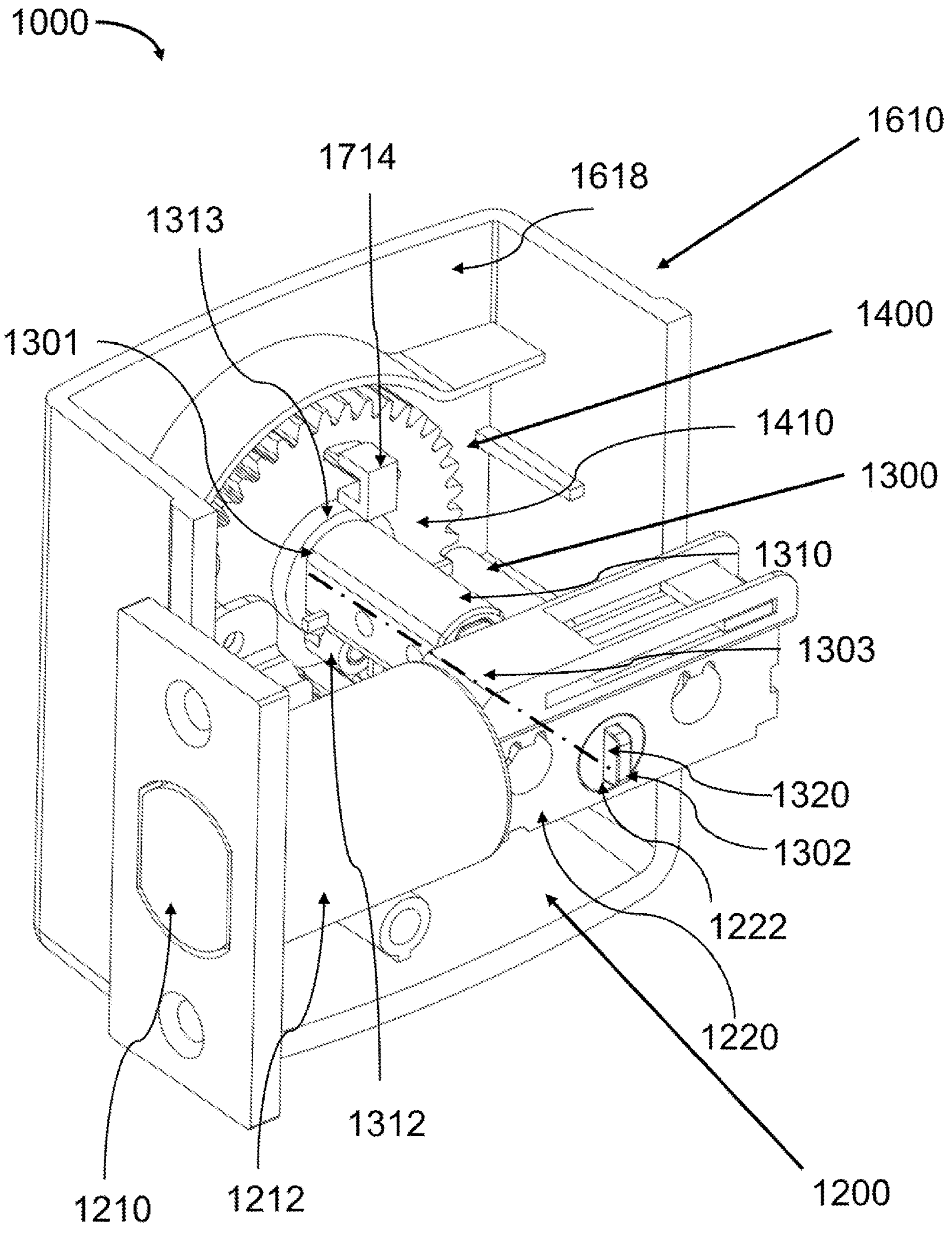
FIG. 1B is a rear view of the electric lock according to the same exemplary embodiment as shown in FIG. 1A after assembly, wherein the lock body is in an unlocked state.
Figure 1C:
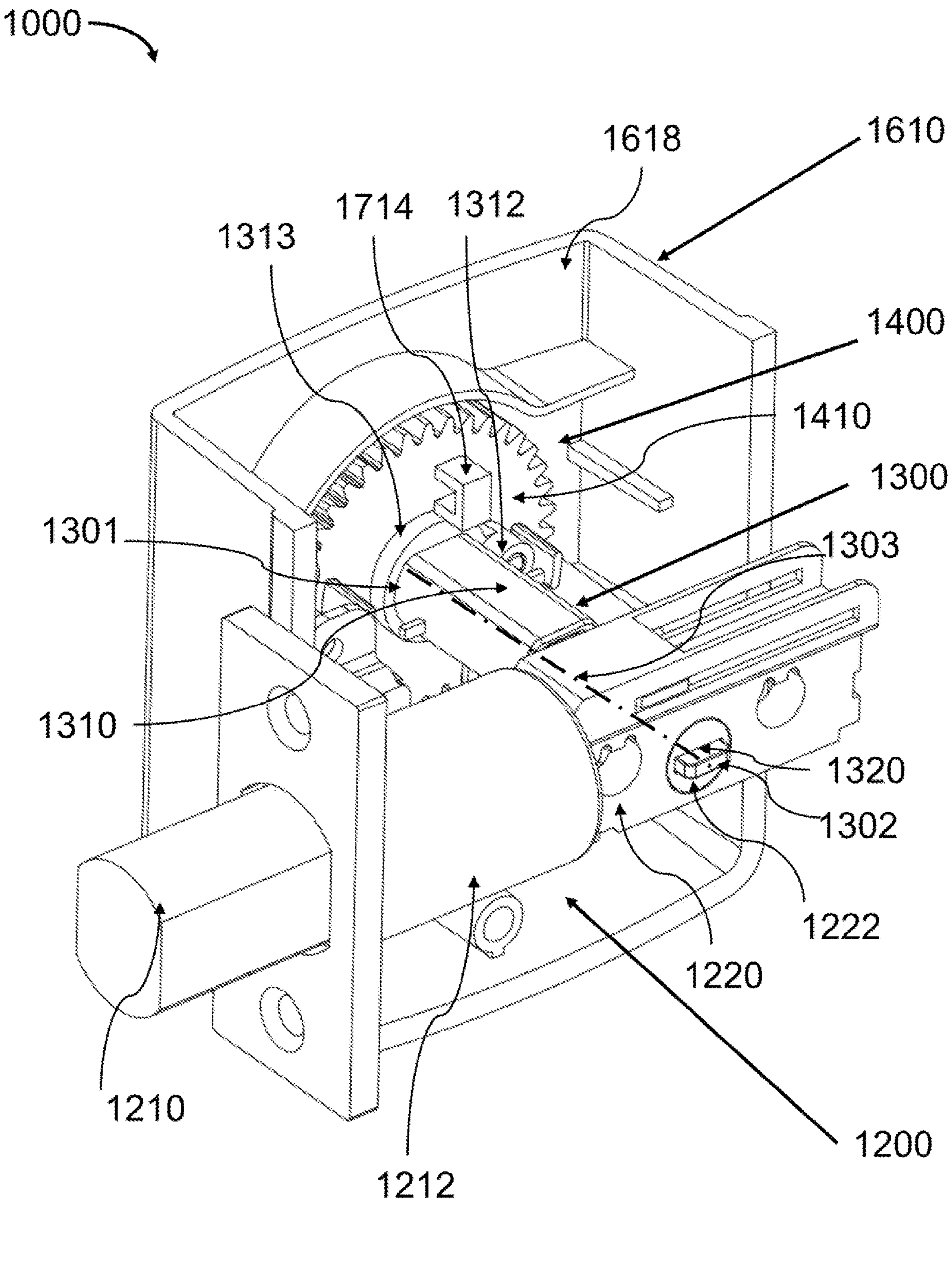
FIG. 1C is a rear view of the electric lock according to the same exemplary embodiment as shown in FIG. 1A after assembly, wherein the lock body is in a locked state.

FIG. 1A to FIG. 1C show an electric lock 1000 according to an exemplary embodiment. The electric lock 1000 substantially comprises a knob 1100, a lock body 1200, a rotatable shaft 1300, a gear assembly 1400, and a motor assembly 1500, and optionally comprises a front cover 1610 and a rear cover 1620 (only shown in FIG. 1A), and a circuit board 1700. For ease of description, a direction towards the knob 1100 is referred to as front, and a direction towards the lock body 1200 is referred to as rear. In this embodiment, the front cover 1610 is connected to the rear cover 1620 to form a housing and define a housing internal space therein. The gear assembly 1400, the motor assembly 1500, the circuit board 1700 and at least part of the rotatable shaft 1300 are arranged within the housing internal space, and the knob 1100 and the lock body 1200 are arranged in front of the front cover 1610 and at the rear of the rear cover 1620 respectively and outside the housing internal space.

Referring now to FIG. 1A, the knob 1100 has a knob front surface 1101 that faces away from the front cover 1610 and an opposing knob rear surface (not shown), both of which have a substantially circular outer periphery. The knob front surface 1101 is provided with a handle 1102 for turning. The knob rear surface has a connecting column (not shown) to connect the rotatable shaft 1300. In this embodiment, the handle 1102 is an elongated handle protruding from the knob front surface 1101.

The front cover 1610 comprises a front cover front surface 1617 and an opposing front cover rear surface 1618 (shown in FIG. 1B and FIG. 1C). The front cover front surface 1617 is provided with a knob mounting groove 1616 for accommodating the knob and a knob mounting hole 1614 for the connecting column of the knob 1100 to be inserted therethrough. The knob 1100 is mounted on the knob mounting groove 1616 of the front cover 1610 and its position is fixed by using a circlip 1612.

The gear assembly 1400 comprises a gear 1410 and an inner core 1420 (in some embodiments, the inner core is also referred to as a movable piece). In this embodiment, the gear 1410 and the inner core 1420 are arranged to have a common axis center. The gear 1410 comprises a gear internal space 1411 for accommodating the inner core 1420 and a gear opening 1413 arranged on the axis center. In this embodiment, the gear 1410 has a gear front face facing the front cover 1610 and an opposing gear rear face, and the gear internal space 1411 is provided on the gear front face of the gear 1410. The inner core 1420 is at least partially mounted in the gear internal space 1411 to be engaged with the gear 1410 to form the gear assembly 1400 as a whole. The inner core 1420 comprises an inner core opening 1421 arranged on the axis center and two symmetrical ball head spring mechanisms 1430A and 1430B disposed in the inner core 1420. The structure of the gear assembly 1400 will be described in detail in later examples.

Referring to FIG. 1B, the rotatable shaft 1300 comprises a rotatable-shaft front end 1301 and an opposing rotatable-shaft rear end 1302. The rotatable-shaft front end 1301 and the rotatable-shaft rear end 1302 define a longitudinal axis 1303 (indicated by a dashed line) therebetween. In this embodiment, the rotatable shaft 1300 is composed of two separate components, namely a rotatable shaft sleeve 1310 positioned at the rotatable-shaft front end 1301 and a shaft body 1320 positioned at the rotatable-shaft rear end 1302. The rotatable shaft sleeve 1310 can be fixedly connected to the shaft body 1320. In an embodiment, the rotatable shaft sleeve 1310 is provided with a shaft body insertion hole (not shown) for the shaft body 1320 to be inserted therein to achieve a fixed connection between the shaft body 1320 and the rotatable shaft sleeve 1310. In this embodiment, the shaft body 1320 is substantially rectangular, and has a shaft body front end 1322 that can be inserted into the shaft body insertion hole of the rotatable shaft sleeve 1310 and an opposing shaft body rear end (i.e., the rotatable-shaft rear end 1302). The rotatable-shaft rear end 1302 can be fixedly connected to the lock body 1200 to control the locking and unlocking of the lock body 1200.

In some embodiments, the electric lock 1000 may further comprise a connector for connecting the knob 1100 to the rotatable shaft 1300. In this embodiment, the connector is a rotatable shaft connector 1316 (shown in FIG. 1A) provided at the rotatable-shaft front end 1301 and extending towards the front along the longitudinal axis 1303. The rotatable shaft connector 1316 comprises a connector front end configured to be connected to the knob 1100 and an opposing connector rear end positioned at the rotatable shaft sleeve 1310, and has a connector outer periphery sized and shaped to match the inner core opening 1421. In this embodiment, the connector front end of the rotatable shaft connector 1316 has a slot 1317 for fixedly receiving the connecting column (not shown) of the knob 1100. The connector front end passes through the gear opening 1413 and the inner core opening 1421, and is fixedly connected to the knob 1100, so that when the knob 1100 is axially rotating in one direction along the longitudinal axis 1303, the knob 1100 can directly drive the inner core 1420 and the rotatable shaft 1300 to rotate in the same direction. In this embodiment, the rotatable shaft sleeve 1310 further comprises an annular flange 1313 disposed near the rotatable-shaft front end 1301 and surrounding the rotatable shaft sleeve 1310, and a protruding portion 1312 substantially perpendicular to the longitudinal axis 1303 and extending away from the rotatable shaft 1300 from the annular flange 1313 (shown in FIG. 1B and FIG. 1C). The arrangement of the annular flange 1313 can prevent the gear assembly 1400 from moving longitudinally along the longitudinal axis 1303 in the assembled electric lock 1000.

The motor assembly 1500 and the gear assembly 1400 are adjacently arranged in the housing internal space (shown in FIG. 1A). The motor assembly 1500 comprises a main gear 1510 and a motor (schematically indicated as a block 1520). The main gear 1510 can be directly or indirectly actuated by the motor 1520, and the main gear 1510 meshes with the gear 1410 of the gear assembly 1400 to drive the gear 1410 to rotate. For example, the motor 1520 can drive the main gear 1510 to rotate in a first direction, thereby causing the gear 1410 to rotate in an opposite second direction.

As mentioned above, the front cover 1610 is connected to the rear cover 1620 to form the housing of the electric lock 1000. The rear cover 1620 (only shown in FIG. 1A, but not shown in FIG. 1B and FIG. 1C) has a rear cover front surface 1621 and an opposing rear cover rear surface (not shown). In this embodiment, the rear cover 1620 is provided with a rear cover opening 1622 to allow the rotatable-shaft rear end 1302 to pass therethrough so as to be fixedly connected to the lock body 1200. Optionally, the rear cover 1620 is further provided with a wire via hole 1623 through which a wire (not shown) passes. In some embodiments, the motor assembly 1500 may be mounted on the rear cover front surface 1621 and is operated by electricity provided by the wire. In some other embodiments, the motor assembly 1500 may be mounted on the front cover rear surface 1618.

In some embodiments, the electric lock 1000 further comprises a circuit board 1700 electrically connected to the motor assembly 1500. The circuit board 1700 may be mounted on the rear cover front surface 1621, and has a circuit board front face 1710 and an opposing circuit board rear face (not shown). In this embodiment, the circuit board 1700 is arranged substantially perpendicular to the longitudinal axis 1303 of the rotatable shaft 1300 and comprises a circuit board opening 1720. The circuit board opening 1720 and the rear cover opening 1622 are substantially aligned with each other after being assembled, to allow the rotatable-shaft rear end 1302 to pass through the two openings to be fixedly connected to the lock body 1200. The circuit board 1700 may also comprise a plurality of sensors arranged thereon for detecting positions of different components. In this embodiment, the circuit board 1700 has a first sensor 1711, a second sensor 1712, a third sensor 1713, and a fourth sensor 1714 that are arranged on the circuit board front face 1710 and around the circuit board opening 1720. The structure of the circuit board 1700 will be described in detail in later examples.

Now continue to refer to FIG. 1A, FIG. 1B and FIG. 1C. In this embodiment, the lock body 1200 of the electric lock 1000 comprises a lock bolt mechanism 1220, a bolt frame 1212 connected to the lock bolt mechanism 1220, and a bolt 1210 disposed therein. The lock bolt mechanism 1220 controls the bolt 1210 to extend out of the lock body 1200 or retract into the lock body 1200, so that the lock body 1200 can be switched between an unlocked state and a locked state, respectively. The lock bolt mechanism 1220 may comprise a rotatable shaft insertion hole 1222 for receiving the rotatable-shaft rear end 1302. In this embodiment, as shown in FIG. 1B and FIG. 1C, the rear end (i.e., the rotatable-shaft rear end 1302) of the shaft body 1320 is inserted into and passes through the rotatable shaft insertion hole 1222, so that the rotatable shaft 1300 and the lock body 1200 are fixedly connected to each other. In this way, the knob 1100, the rotatable shaft 1300 and the lock body 1200 are fixedly connected to each other, so that when the knob 1100 rotates, the rotatable shaft 1300 is driven to rotate to control the locking and unlocking of the lock body 1200. As shown in FIG. 1B, in the unlocked state, the bolt 1210 is hidden in the lock body 1200. As shown in FIG. 1C, in this embodiment, when the rotatable shaft 1300 is axially rotated by about 90° along the longitudinal axis 1303, the rotatable shaft 1300 drives the lock body 1200 to be switched from the unlocked state to the locked state, and the bolt 1210 extends out of the lock body 1200 in the locked state.

In an embodiment, at least a part of the lock body 1200 can be mounted or embedded in a side face of a door (not shown) to lock or unlock the door. In an embodiment, the housing can be mounted on the door and faces the inside of a room (not shown), so that a user can manually unlock the lock from the inside of the room when necessary, thereby preventing the situation that the user is trapped indoors.

Example 2

Figure 2A:
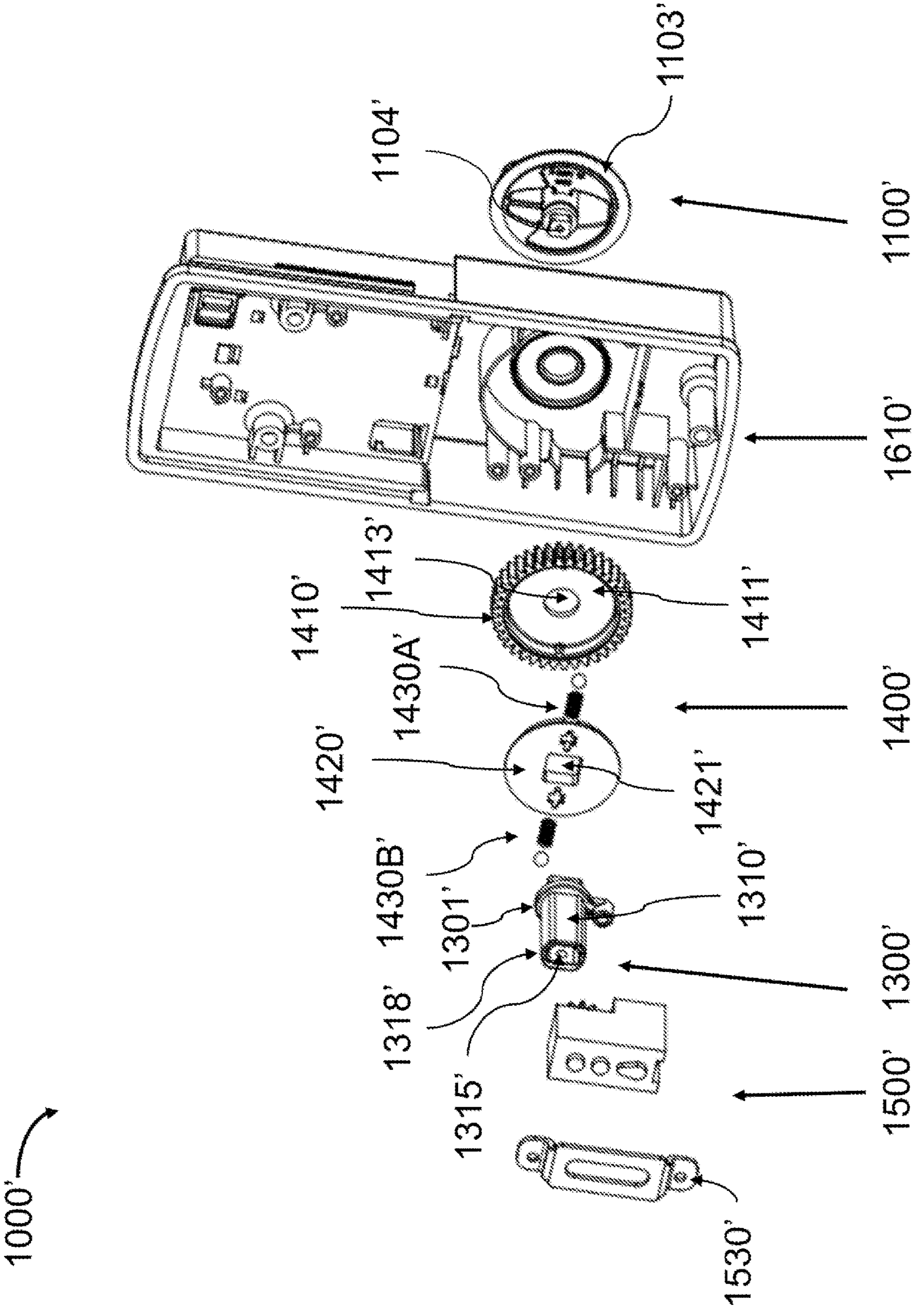
FIG. 2A is an exploded view of the structure of an electric lock according to another exemplary embodiment.
Figure 2B:
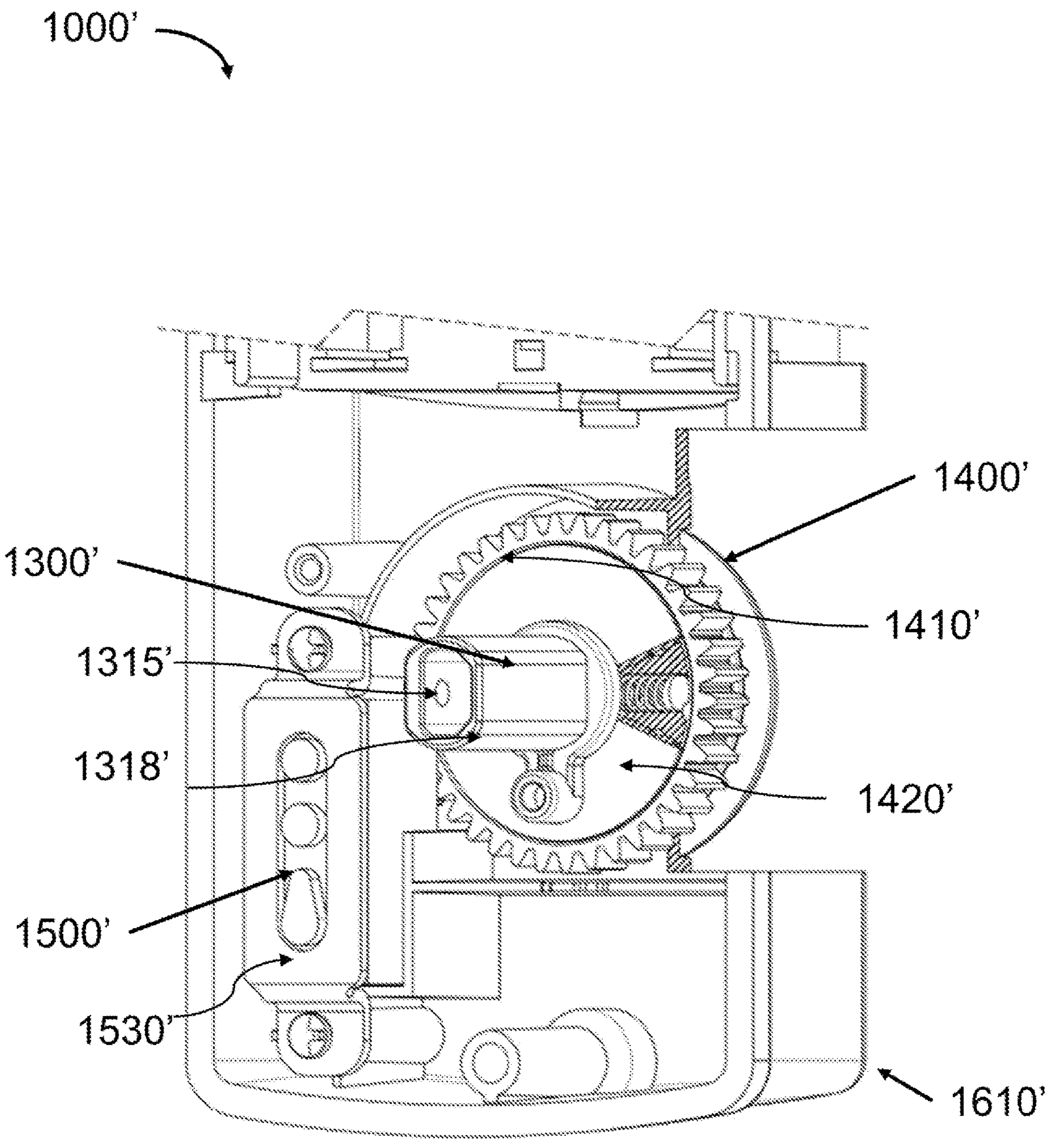
FIG. 2B is a rear view of the electric lock according to the same exemplary embodiment as shown in FIG. 2A after assembly.

FIG. 2A and FIG. 2B show an electric lock 1000' according to another exemplary embodiment. In this embodiment, the electric lock 1000' comprises a knob 1100', a lock body (not shown), a rotatable shaft 1300', a gear assembly 1400', a motor assembly 1500', a front cover 1610' and a rear cover (not shown). The structures and arrangements of these components are generally similar to those described in Example 1. In this embodiment, the electric lock 1000' may not include a circuit board.

Referring to FIG. 2A, in this embodiment, the gear assembly 1400' comprises a gear 1410' and an inner core 1420' with a common axis center. The gear 1410' comprises a gear internal space 1411' for accommodating the inner core 1420' and a gear opening 1413' arranged on the axis center, and the inner core 1420' comprises an inner core opening 1421' arranged on the axis center and two symmetrical ball head spring mechanisms 1430A' and 1430B' disposed in the inner core 1420'. Different from Example 1, in this embodiment, the gear internal space 1411' is provided on the gear rear face of the gear 1410' away from the front cover 1610'. Therefore, in the assembled electric lock 1000' (FIG. 2B), the inner core 1420' is arranged in a direction away from the front cover 1610'.

In this embodiment, the knob 1100' comprises a knob rear surface 1103' (FIG. 2A) that faces the front cover 1610' and has a connecting column 1104' protruding from the knob rear surface 1103'. In some embodiments, the connecting column 1104' can serves as a connector for connecting the knob 1100' to the rotatable shaft 1300', the connecting column 1104' passes through the inner core opening 1421' to be connected to the rotatable-shaft front end 1301' of the rotatable shaft 1300', and has a connector outer periphery sized and shaped to match the inner core opening 1421'. For example, in the embodiment shown in FIG. 2A, the inner core opening 1421' and the outer periphery of the connecting column 1104' may have a shape of a square with substantially the same size and shape, so that when the knob 1100' is axially rotating in one direction, the knob 1100' can directly drive the inner core 1420' and the rotatable shaft 1300' to rotate in the same direction. In other embodiments, the connecting column 1104' may not be used as a connector having an outer periphery that matches the inner core opening, but only configured to be inserted into the slot (not shown) at the rotatable-shaft front end 1301', so as to achieve a fixed connection between the knob 1100' and the rotatable shaft 1300'.

Still referring to FIG. 2A and FIG. 2B, in this embodiment, the rotatable shaft 1300' comprises a rotatable shaft sleeve 1310', which comprises a rotatable shaft sleeve rear end 1318' that faces away from the front cover 1610'. Optionally, the rotatable shaft sleeve rear end 1318' is provided with a shaft body insertion hole 1315' for allowing the shaft body (not shown) to be inserted therein to achieve a fixed connection between the two, and the shaft body can be fixedly connected to the lock body (not shown) to control the locking or unlocking of the lock body.

Optionally, the electric lock 1000' may further comprise a motor fixing plate 1530' for fixedly mounting the motor assembly 1500' on the front cover 1610' (as shown in FIG. 2B) or the rear cover.

Gear Assembly

Example 3

Referring to FIG. 3A to FIG. 3D, an exemplary embodiment of a gear assembly 1400 is shown. It should be understood that although the same reference numeral "gear assembly 1400" as in Example 1 is used to describe the exemplary embodiment of the gear assembly, the gear assembly described in Example 3 is not limited to being applied to the electric lock 1000 of Example 1, but it may also be applied to any other examples of electric locks, including but not limited to the electric lock 1000' of Example 2 described above. Therefore, in some embodiments, the gear assembly 1400 may alternatively be the gear assembly 1400' in Example 2.

As described above, the gear assembly 1400 comprises a gear 1410 and an inner core 1420 with a common axis center 1402. The gear 1410 comprises an internal wall 1414 and a gear opening 1413 arranged on the axis center 1402. The internal wall 1414 defines a gear internal space 1411 for accommodating the inner core 1420. The gear 1410 has a gear front face 1404 (shown in FIG. 3A) and an opposing gear rear face 1406 (shown in FIG. 3B), and the gear internal space 1411 is provided on the gear front face 1404 of the gear 1410. In this embodiment, the internal wall 1414 of the gear 1410 is substantially circular. The internal wall 1414 further comprises a first protrusion 1412A and a second protrusion 1412B (in some embodiments, protrusions are also referred to as mechanical barriers) that are symmetrically arranged on two opposite sides of the internal wall 1414 and extend towards the axis center 1402. In this embodiment, the gear opening 1413 is substantially circular to allow a connector of a knob or a rotatable shaft (not shown) to pass therethrough.

The inner core 1420 may be at least partially mounted in the gear internal space 1411 to be engaged with the gear 1410. The inner core 1420 has an inner core front face 1424 (shown in FIG. 3A) away from the gear 1410 and an opposing inner core rear face 1425 (shown in FIG. 3B) that faces the gear 1410. In this embodiment, the inner core 1420 has a substantially disc-shaped inner core outer periphery, which is slightly smaller than the outer periphery of the gear internal space 1411. The inner core 1420 comprises an inner core opening 1421 arranged on the axis center 1402. Optionally, the inner core front face 1424 is further provided with an inner core cover plate 1426 with an outer periphery that matches (for example, equal to or slightly larger than) the inner circumference (i.e., the internal wall 1414) of the gear 1410, so that the inner core 1420 can be firmly mounted in the gear internal space 1411 to prevent it from falling off. The inner core cover plate 1426 comprises an inner core cover plate opening 1428 that is aligned with the inner core opening 1421. In this embodiment, the inner core opening 1421 is substantially square, and the inner core cover plate opening 1428 is substantially circular and is slightly smaller than the inner core opening 1421. Such arrangement enables the rotatable-shaft front end (not shown) in the assembled electric lock to pass through the inner core opening 1421 but not to pass through the inner core cover plate opening 1428 to prevent longitudinal movement of the rotatable shaft.

In this embodiment, the size of the gear opening 1413 is larger than that of the inner core opening 1421, so that when a user manually rotates the knob (not shown), the knob can drive the inner core 1420 and the rotatable shaft (not shown) to rotate independently of the gear 1410.

Figure 3A:
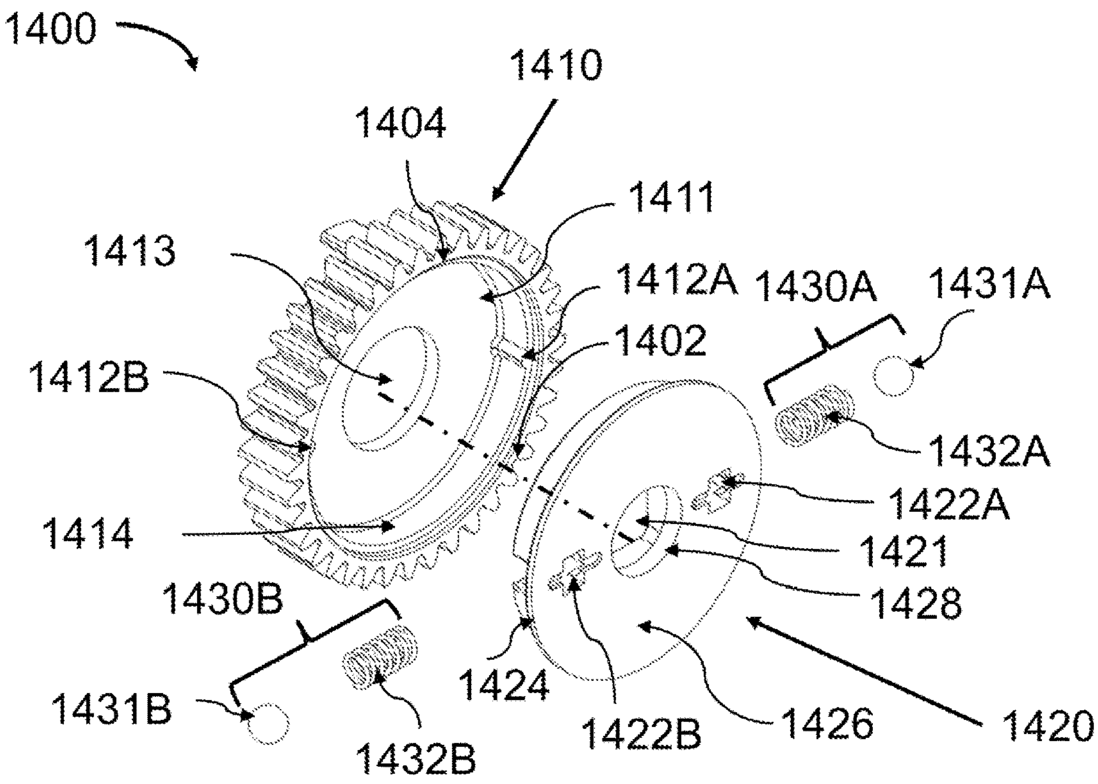
FIG. 3A is an exploded view of a gear assembly according to an exemplary embodiment.
Figure 3B:
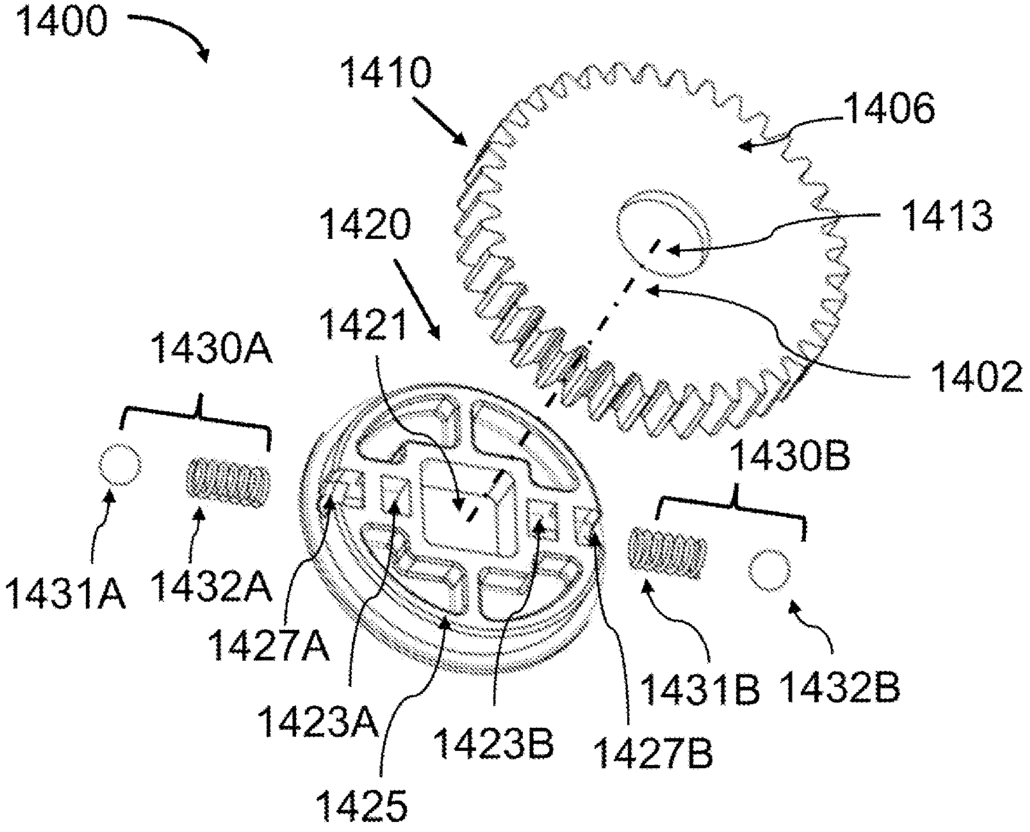
FIG. 3B is an exploded view of the gear assembly viewed from another angle according to the same exemplary embodiment as shown in FIG. 3A.
Figure 3C:
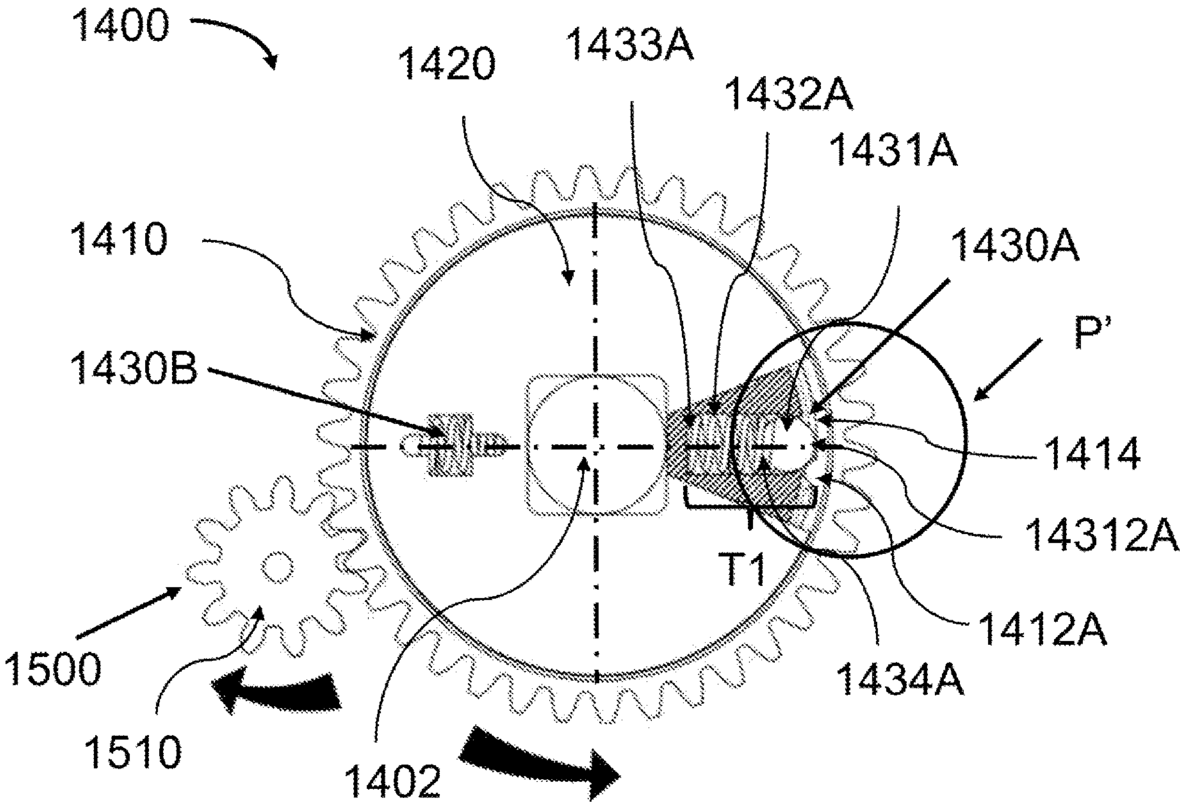
FIG. 3C is a schematic structural diagram of the gear assembly and a main gear of a motor assembly according to the same exemplary embodiment as shown in FIG. 3A.
Figure 3D:
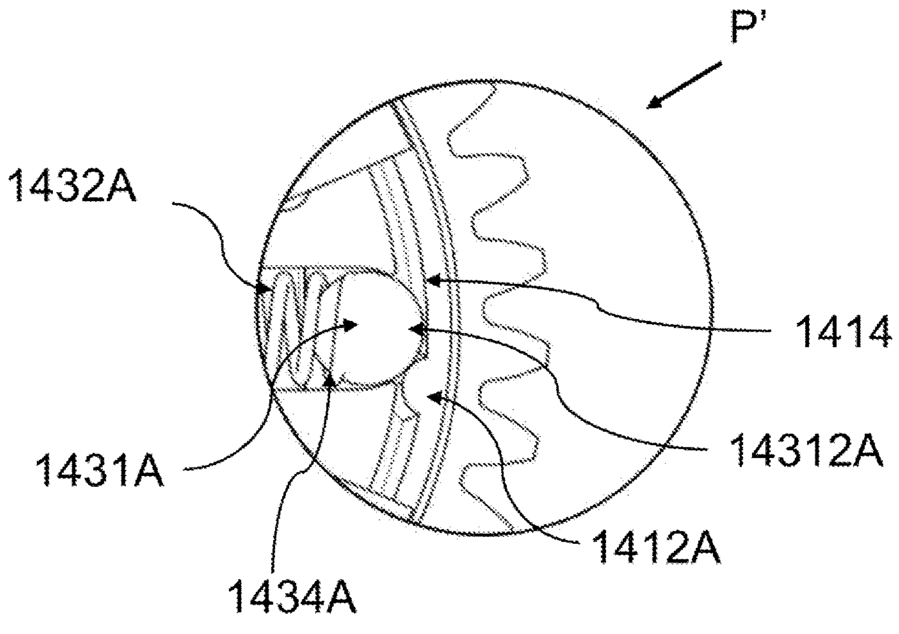
FIG. 3D shows an enlarged view of a region P' of FIG. 3C.

As shown in FIG. 3A and FIG. 3B, the inner core 1420 further comprises a first recess 1423A and a second recess 1423B (as shown in FIG. 3B). The first recess 1423A and the second recess 1423B are symmetrically arranged in the inner core 1420 with the inner core opening 1421 as a center, and have open ends 1427A and 1427B respectively on the outer periphery of the inner core 1420 and opposing closed ends. The open end 1427A and its opposite closed end define a first recess length of the first recess 1423A, and the open end 1427B and its opposite closed end define a second recess length of the second recess 1423B. The first recess 1423A and the second recess 1423B are configured to accommodate the first ball head spring mechanism 1430A and the second ball head spring mechanism 1430B, respectively. The first ball head spring mechanism 1430A comprises a helical spring 1432A and a bead 1431A. When assembled, the spring 1432A and the bead 1431A are sequentially placed into the first recess 1423A from the open end 1427A, so that the bead 1431A forms a ball head of the first ball head spring mechanism 1430A away from the inner core opening 1421. The second ball head spring mechanism 1430B comprises a spring 1432B and a bead 1431B. When assembled, the spring 1432B and the bead 1431B are sequentially placed into the second recess 1423B from the open end 1427B, so that the bead 1431B forms a ball head of the second ball head spring mechanism 1430B away from the inner core opening 1421 (the specific arrangement is shown in FIG. 3C and FIG. 3D). In this embodiment, as shown in FIG. 3A, the inner core cover plate 1426 further comprises side holes 1422A and 1422B with positions corresponding to the first recess 1423A and the second recess 1423B, respectively, so as to provide the positions for applying force when a user needs to move the inner core 1420 away from the gear 1410.

Referring to FIG. 3C and FIG. 3D, an assembled gear assembly 1400 is shown, wherein the inner core 1420 is mounted in the gear 1410 internal space, and both have a common axis center 1402. To clearly show the internal structure, a part of the gear 1410 in FIG. 3C is removed to expose the first ball head spring mechanism 1430A placed in the first recess 1423A of the inner core 1420. The spring 1432A of the first ball head spring mechanism 1430A is arranged in the first recess 1423A, and has a distal end 1434A extending away from the axis center 1402 and an opposing proximal end 1433A. The bead 1431A is placed at the distal end 1434A and has an end face 14312A away from the axis center 1402, and the end face 14312A abuts the internal wall 1414 of the gear 1410. The proximal end 1433A of the spring 1432A and the end face 14312A define a variable length T1 of the first ball head spring mechanism 1430A. The length T1 can be changed in response to the stretching and retraction of the spring 1432A. As described above, the internal wall 1414 comprises a first protrusion 1412A and a second protrusion (not shown) that are symmetrically arranged on two opposite sides of the internal wall 1414 and extend towards the axis center 1402. Although the structure of the second ball head spring mechanism 1430B that is symmetrical to the first ball head spring mechanism 1430A is not fully shown in FIG. 3C and FIG. 3D, it should be understood that, in this embodiment, the structure and arrangement of the second ball head spring mechanism 1430B may be similar to those of the first ball head spring mechanism 1430A.

FIG. 3C further shows a main gear 1510 of a motor assembly 1500, which meshes with the gear 1410 of the gear assembly 1400 to drive the gear 1410 to rotate. FIG. 3C shows an embodiment in which the motor assembly 1500 drives the gear 1410 to rotate. For ease of description, the directions of rotation of the gears are indicated by arrows. In this embodiment, as viewed from a gear front face, the main gear 1510 of the motor assembly 1500 rotates in a clockwise direction, thereby causing the gear 1410 to rotate in an opposite counterclockwise direction with the axis center 1402 as the center.

As shown in FIG. 3C and FIG. 3D, in this embodiment, the spring 1432A has an elastic force pressing against the bead, so that the end face 14312A of the bead 1431A keeps abutting the internal wall 1414 of the gear 1410. At this time, the length T1 of the first ball head spring mechanism 1430A is slightly longer than the first recess length of the first recess 1423A. When the motor assembly 1500 drives the main gear 1510 to rotate in the clockwise direction, so that the gear

1410 rotates counterclockwise, since the first protrusion 1412A abuts the bead 1431A, and the elastic force of the spring 1432A is sufficient to bear a mutual thrust between the first protrusion 1412A and the bead 1431A, so that an initial position of the bead 1431A relative to the gear 1410 continues to be maintained, and the length T1 of the first ball head spring mechanism 1430A remains substantially unchanged, such that the first protrusion 1412A can interact with the first ball head spring mechanism 1430A to drive the inner core 1420 to rotate counterclockwise together with the gear 1410.

On the other hand, when the gear 1410 is immobilized (for example, when the motor assembly 1500 stops operation, or power failure suddenly occurs halfway during electric lock locking or unlocking or a locked rotor occurs during locking), a user can manually rotate the knob (not shown) to drive the inner core 1420 to rotate in the opposite clockwise direction. In the situation of the initial position where the bead 1431A abuts the first protrusion 1412A, when a sufficient rotational force is applied to the knob to offset the mutual thrust between the first protrusion 1412A and the bead 1431A, the spring 1432A can be compressed, the length T1 of the first ball head spring mechanism 1430A is correspondingly reduced, so that the bead 1431A leaves the initial position and passes over the first protrusion 1412A, such that the inner core 1420 can be free to rotate in a clockwise direction relative to the gear 1410. Specific operations of the electric lock will be described in more detail below.

Example 4

FIG. 4A to FIG. 4D show a gear assembly 2400 according to another exemplary embodiment. The gear assembly as described in Example 4 can be applied to the aforementioned electric lock 1000 of Example 1, the electric lock 1000' of Example 2, or any other examples of electric locks. Therefore, in some embodiments, the gear assembly 2400 may replace the gear assembly 1400 in Example 1. In some other embodiments, the gear assembly 2400 may replace the gear assembly 1400' in Example 2.

Figure 4A:
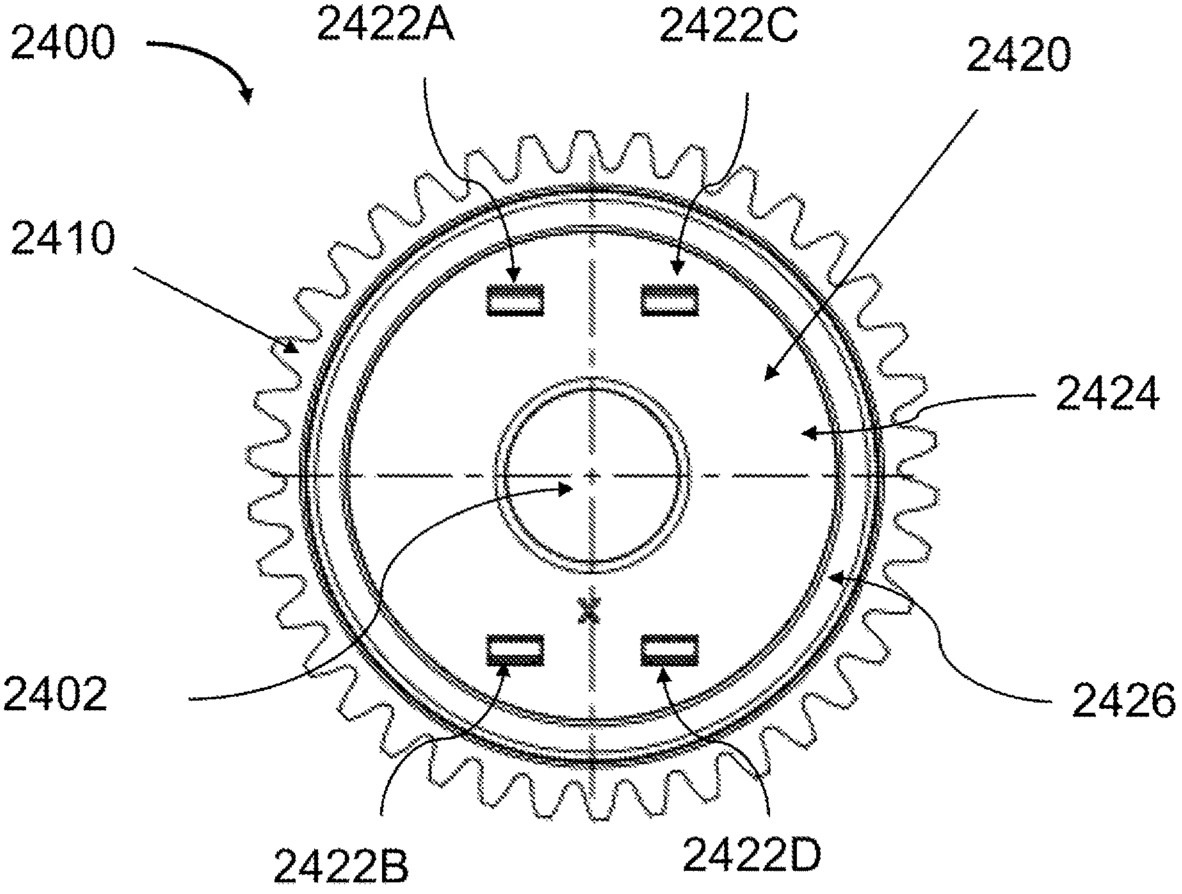
FIG. 4A is a schematic front view of a gear assembly according to another exemplary embodiment.
Figure 4B:
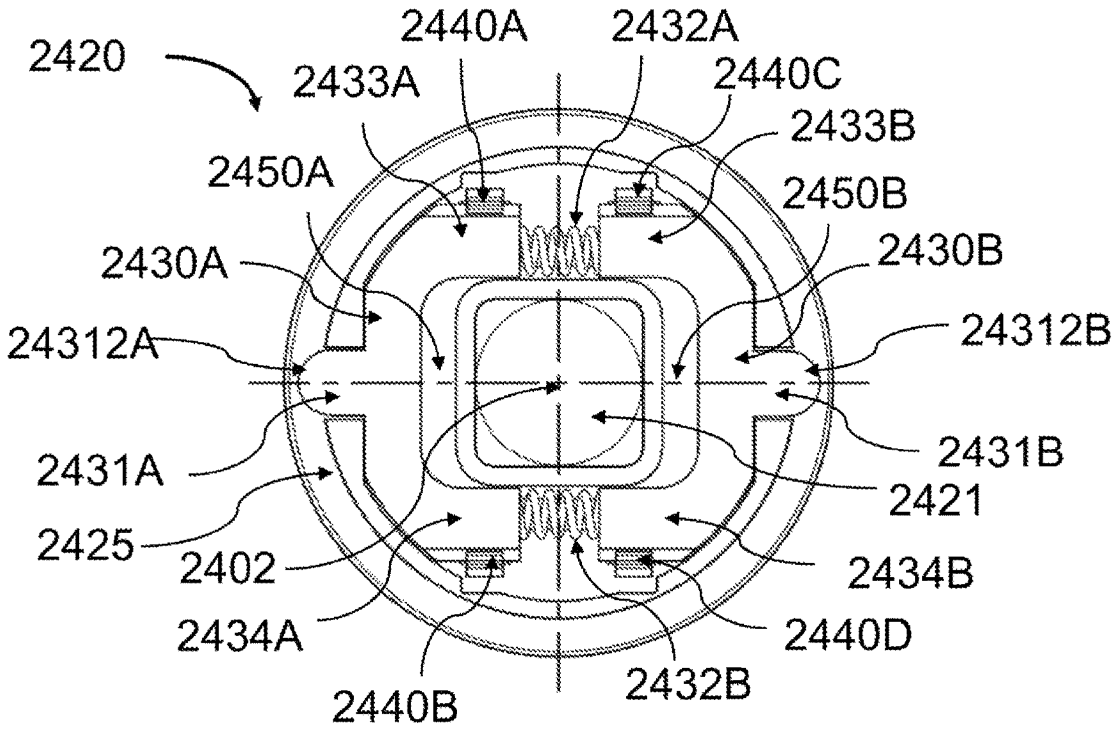
FIG. 4B is a schematic back view of an inner core of the gear assembly as shown in FIG. 4A.
Figure 4C:
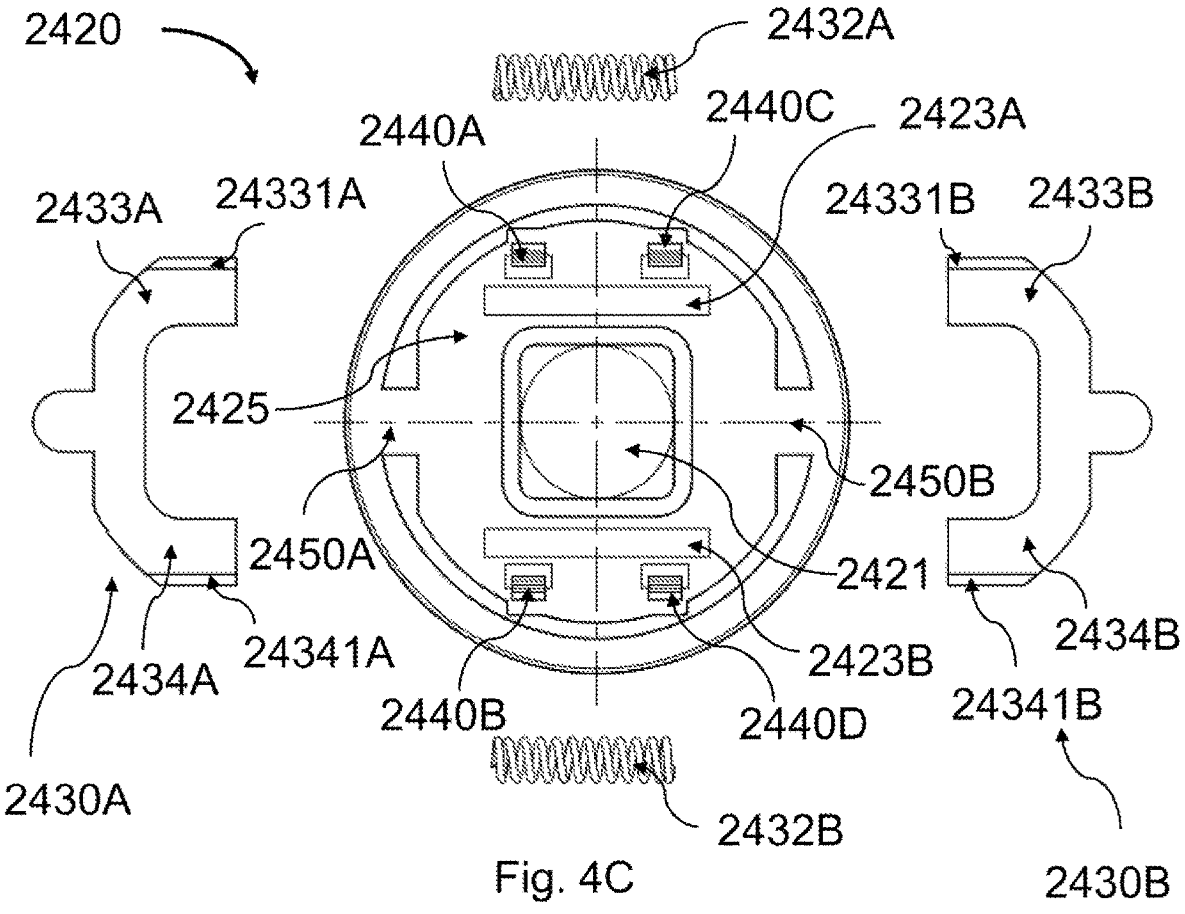
FIG. 4C is an exploded view of the inner core as shown in FIG. 4B.
Figure 4D:
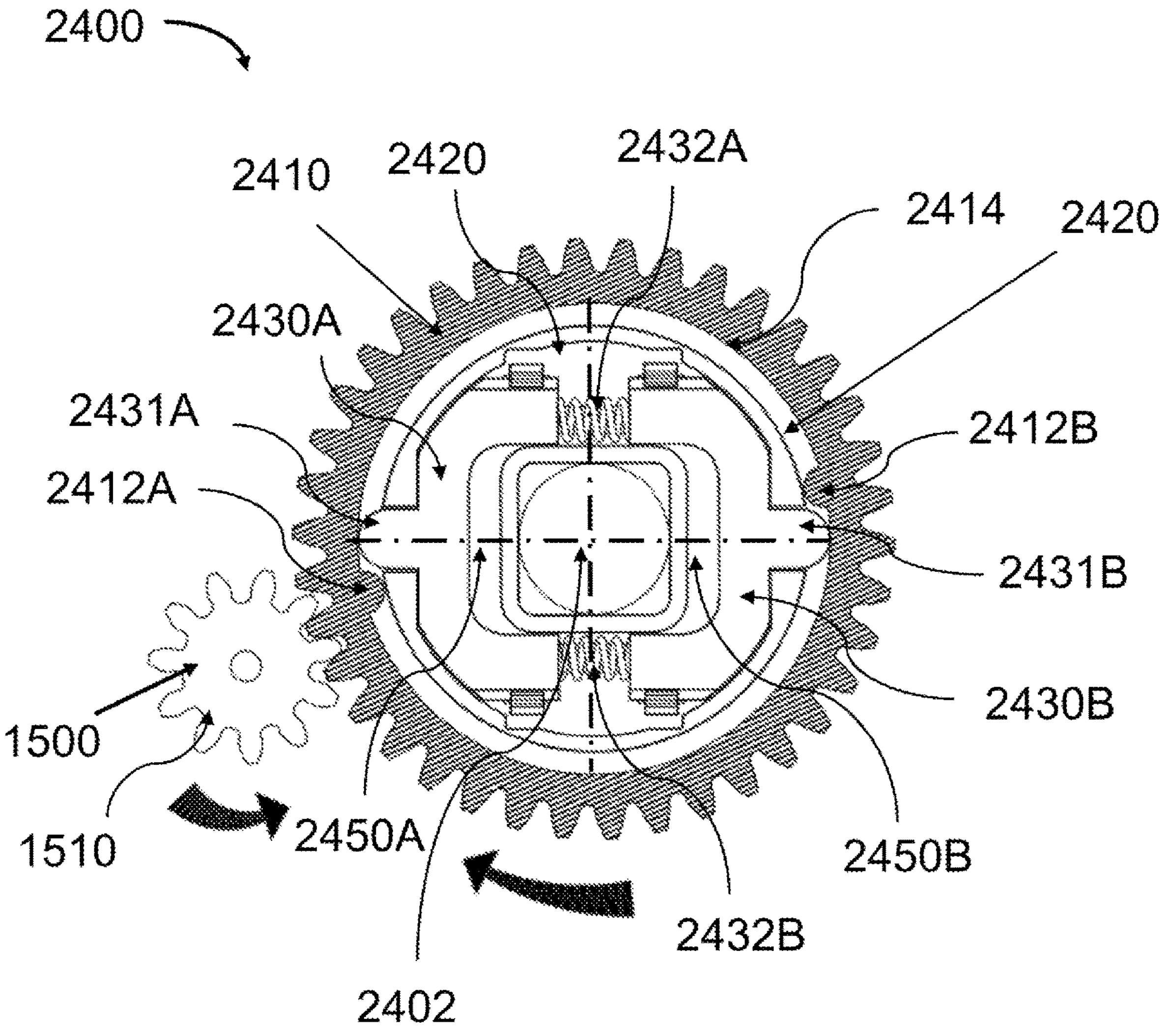
FIG. 4D is a schematic structural diagram of the gear assembly and a main gear of a motor assembly according to the same exemplary embodiment as shown in FIG. 4A.

Referring now to FIG. 4A and FIG. 4D, the gear assembly 2400 comprises a gear 2410 and an inner core 2420 with a common axis center 2402. In this embodiment, the structure and arrangement of the gear 2410 are generally the same with the gear 1410 in Example 3. As shown in FIG. 4D, the internal wall 2414 of the gear 2410 defines a gear internal space for accommodating the inner core 2420. The internal wall 2414 further comprises a first protrusion 2412A and a second protrusion 2412B (in some embodiments, protrusions are also referred to as mechanical barriers) that are symmetrically arranged on two opposite sides of the internal wall 2414 and extend towards the axis center 2402.

Referring now to FIG. 4A to FIG. 4D, the inner core 2420 may be at least partially mounted in the gear 2410 internal space to be engaged with the gear 2410. The inner core 2420 has an inner core front face 2424 (shown in FIG. 4A) away from the gear 2410 and an opposing inner core rear face 2425 (shown in FIG. 4B and FIG. 4C) that faces the gear 2410. Optionally, the inner core front face 2424 is further provided with an inner core cover plate 2426 with an outer periphery that matches (for example, equal to or slightly larger than) the inner circumference (i.e., the internal wall 2414) of the gear 2410, so that the inner core 2420 can be firmly mounted in the gear 2410 internal space to prevent it from falling off. In this embodiment, the inner core cover plate 2426 further comprises side holes 2422A, 2422B, 2422C, and 2422D, and the positions and functions thereof will be described in more detail below.

Referring now to FIG. 4B and FIG. 4C, the inner core 2420 comprises an inner core opening 2421 arranged on the axis center 2402, a first frame 2430A, a second frame 2430B, a first spring 2432A, and a second spring 2432B. In this embodiment, the first frame 2430A and the second frame 2430B are symmetrically arranged in the inner core 2420. The first frame 2430A comprises a first ball head 2431A disposed thereon, which extends away from the axis center 2402 and has a first end face 24312A away from the axis center 2402, and has a radian at the first end face 24312A. The first ball head 2431A and the axis center 2402 define a first radial axis 2450A therebetween. The first frame 2430A further comprises a first arm 2433A and a second arm 2434A, which are respectively arranged on one side of the first radial axis 2450A and extend towards the second frame 2430B. The second frame 2430B comprises a second ball head 2431B disposed thereon, which extends away from the axis center 2402 and has a second end face 24312B away from the axis center 2402, and has a radian at the second end face 24312B. The second ball head 2431B and the axis center 2402 define a second radial axis 2450B therebetween. The second frame 2430B further comprises a third arm 2433B and a fourth arm 2434B, which are respectively arranged on one side of the second radial axis 2450B and extend towards the first frame 2430A. In this embodiment, the first radial axis 2450A and the second radial axis 2450B are in parallel alignment with each other. The first arm 2433A and the third arm 2433B are positioned to be adjacent to each other, and the second arm 2434A and the fourth arm 2434B are positioned to be adjacent to each other.

In this embodiment, the first spring 2432A is positioned between the first arm 2433A of the first frame 2430A and the third arm 2433B of the second frame 2430B, where one end of the first spring 2432A is received by the first arm 2433A and abuts the first arm 2433A, and the other opposing end is received by the third arm 2433B and abuts the third arm 2433B, so as to elastically connect the two (i.e., the first arm 2433A of the first frame 2430A and the third arm 2433B of the second frame 2430B). The second spring 2432B is positioned between the second arm 2434A of the first frame 2430A and the fourth arm 2434B of the second frame 2430B, where one end of the second spring 2432B is received by the second arm 2434A and abuts the second arm 2434A, and the other opposing end is received by the fourth arm 2434B and abuts the fourth arm 2434B, so as to elastically connect the two (i.e., the second arm 2434A of the first frame 2430A and the fourth arm 2434B of the second frame 2430B). Optionally, the inner core 2420 may further comprise a first recess 2423A and a second recess 2423B (shown in FIG. 4C) provided on the inner core rear face 2425, which are configured to accommodate at least one part of the first spring 2432A and the second spring 2432B, respectively, so as to maintain the positions of the first spring 2432A and the second spring 2432B in the inner core 2420. The arrangement of the first spring 2432A and the second spring 2432B allows the first frame 2430A and the second frame 2430B to be elastically connected to each other, such that the first ball head 2431A and the second ball head 2431B extend away from the axis center 2402 and abut the internal wall 2414 of the gear 2410 (shown in FIG. 4D) at the first end face 24312A and the second end face 24312B, respectively.

In some embodiments, the electric lock may further comprise a first restricting member 2440A, a second restricting member 2440B, a third restricting member 2440C, and a fourth restricting member 2440D that are disposed on the inner core rear face 2425. In this embodiment, the restricting members 2440A to 2440D have a structure of a clip. Optionally, the first arm 2433A of the first frame 2430A is provided with a first guide rail 24331A on a side away from the first radial axis 2450A, and the second arm 2434A is provided with a second guide rail 24341A on a side away from the first radial axis 2450A. The third arm 2433B of the second frame 2430B is provided with a third guide rail 24331B on a side away from the second radial axis 2450B; and the fourth arm 2434B of the second frame 2430B is provided with a fourth guide rail 24341B on a side away from the second radial axis 2450B. In this embodiment, the first restricting member 2440A and the second restricting member 2440B are placed juxtapose with the first guide rail 24331A and the second guide rail 24341A respectively and restrict the first frame 2430A to move along the first guide rail 24331A and the second guide rail 24341A respectively, so as to hold the first frame 2430A and restrict the first ball head 2431A to move along the first radial axis 2450A. The third restricting member 2440C and the fourth restricting member 2440D are placed juxtapose with the third guide rail 24331B and the fourth guide rail 24341B respectively and restrict the second frame 2430B to move along the third guide rail 24331B and the fourth guide rail 24341B respectively, so as to hold the second frame 2430B and restrict the second ball head 2431B to move along the second radial axis 2450B.

In this embodiment, as shown in FIG. 4A, the inner core cover plate 2426 further comprises side holes 2422A, 2422B, 2422C, and 2422D, the positions of the side holes correspond to the first restricting member 2440A, the second restricting member 2440B, the third restricting member 2440C and the fourth restricting member 2440D respectively, to at least partially accommodate the first restricting member 2440A, the second restricting member 2440B, the third restricting member 2440C, and the fourth restricting member 2440D respectively, and provide the positions for applying force when a user needs to move the inner core 2420 away from the gear 2410.

Referring now to FIG. 4D, an assembled gear assembly 2400 is shown, wherein the inner core 2420 is mounted in the gear 2410 internal space, and both have a common axis center 2402. To clearly show the internal structure of the inner core 14202420, the inner core cover plate is not shown in FIG. 4D. As described above, the internal wall 2414 comprises a first protrusion 2412A and a second protrusion 2412B that are symmetrically arranged on two opposite sides of the internal wall 2414 and extend towards the axis center 2402. The inner core 2420 comprises a first frame 2430A and a second frame 2430B disposed therein. The first frame 2430A and the second frame 2430B are elastically connected to each other via the first spring 2432A and the second spring 2432B, so that the first ball head 24312A and the second ball head 2431B abut the internal wall 2414.

FIG. 4D further shows a main gear 1510 of a motor assembly 1500, which meshes with the gear 2410 of the gear assembly 2400 to drive the gear 2410 to rotate. FIG. 4D shows an embodiment in which the motor assembly 1500 drives the gear 2410 to rotate. For ease of description, the directions of rotation of the gears are indicated by arrows. In this embodiment, as viewed from a gear front face, the main gear 1510 of the motor assembly 1500 rotates in a counterclockwise direction, thereby causing the gear 2410 to rotate in an opposite clockwise direction with the axis center 2402 as the center.

As shown in FIG. 4D, in this embodiment, the first spring 2432A and the second spring 2432B have elastic forces pressing against the first frame 2430A and the second frame 2430B, so that the first ball head 2431A and the second ball head 2431B keep abutting the internal wall 2414 of the gear 2410. When the motor assembly 1500 drives the main gear 1510 to rotate in the counterclockwise direction, so that the gear 14102410 rotates clockwise, since the first protrusion 2412A abuts the first ball head 2431A, the second protrusion 2412B abuts the second ball head 2431B, and the elastic forces of the first spring 2432A and the second spring 2432B are sufficient to bear a mutual thrust between the first protrusion 2412A and the second protrusion 2412B and the respective first ball head 2431A and the second ball head 2431B, so that a relative distance between the first frame 2430A and the second frame 2430B remains substantially unchanged, such that under the interaction of the first protrusion 2412A and the second protrusion 2412B with the first frame 2430A and the second frame 2430B respectively, the inner core 2420 is driven to rotate clockwise together with the gear 2410.

On the other hand, when the gear 2410 is immobilized (for example, when the motor assembly 1500 stops operation, or power failure suddenly occurs halfway during electric lock locking or unlocking or a locked rotor occurs during locking), a user can manually rotate the knob (not shown) to drive the inner core 2420 to rotate in the opposite counterclockwise direction. In the situation of an initial position where the first ball head 2431A and the second ball head 2431B abut the first protrusion 2412A and the second protrusion 2412B respectively, when a sufficient rotational force is applied to the knob to offset the mutual thrust between the first ball head 2431A and the second ball head 2431B and the respective first protrusion 2412A and the second protrusion 2412B, the first spring 2432A and the second spring 2432B can be compressed, so that the first frame 2430A and the second frame 2430B approach each other and a relative distance between the two is correspondingly reduced, such that the first ball head 2431A and the second ball head 2431B leave the initial positions respectively and pass over the first protrusion 2412A and the second protrusion 2412B, such that the inner core 2420 can be free to rotate in a counterclockwise direction relative to the gear 2410. Specific operations of the electric lock will be described in more detail below.

Example 5

Figure 5A:
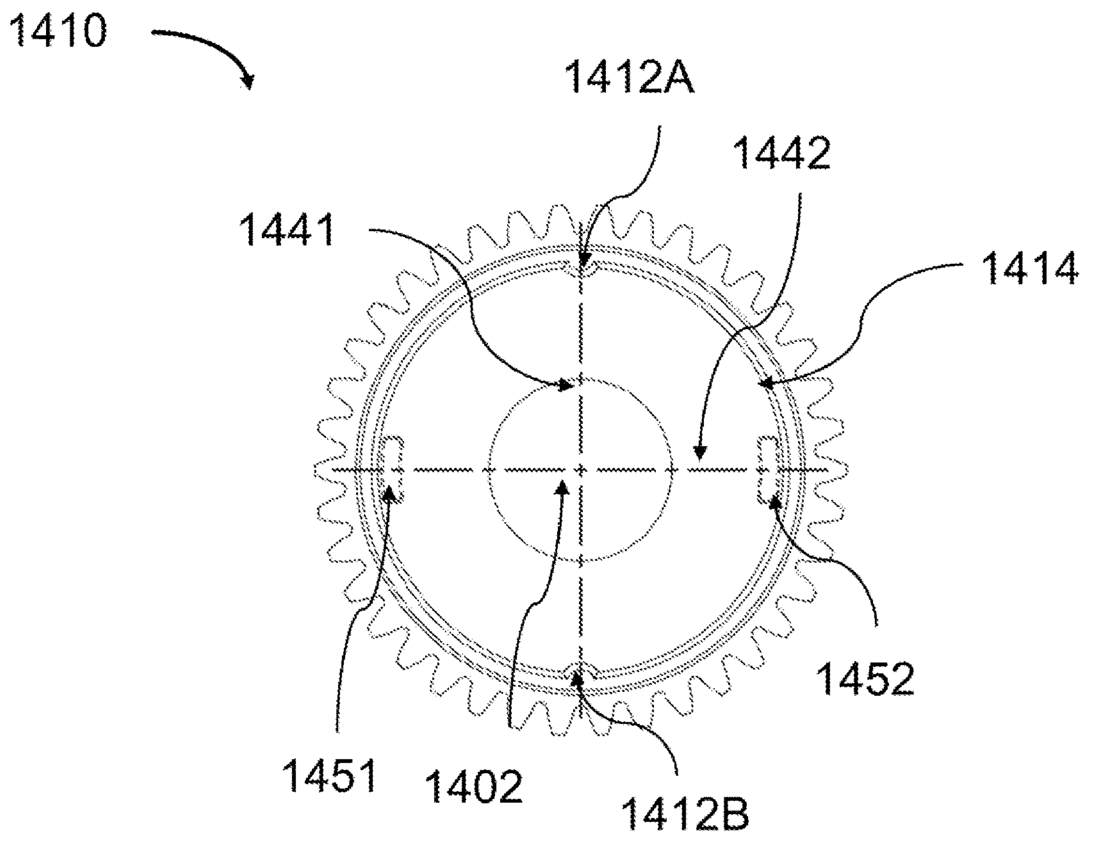
FIG. 5A is a schematic front view of a gear according to an exemplary embodiment.
Figure 5B:
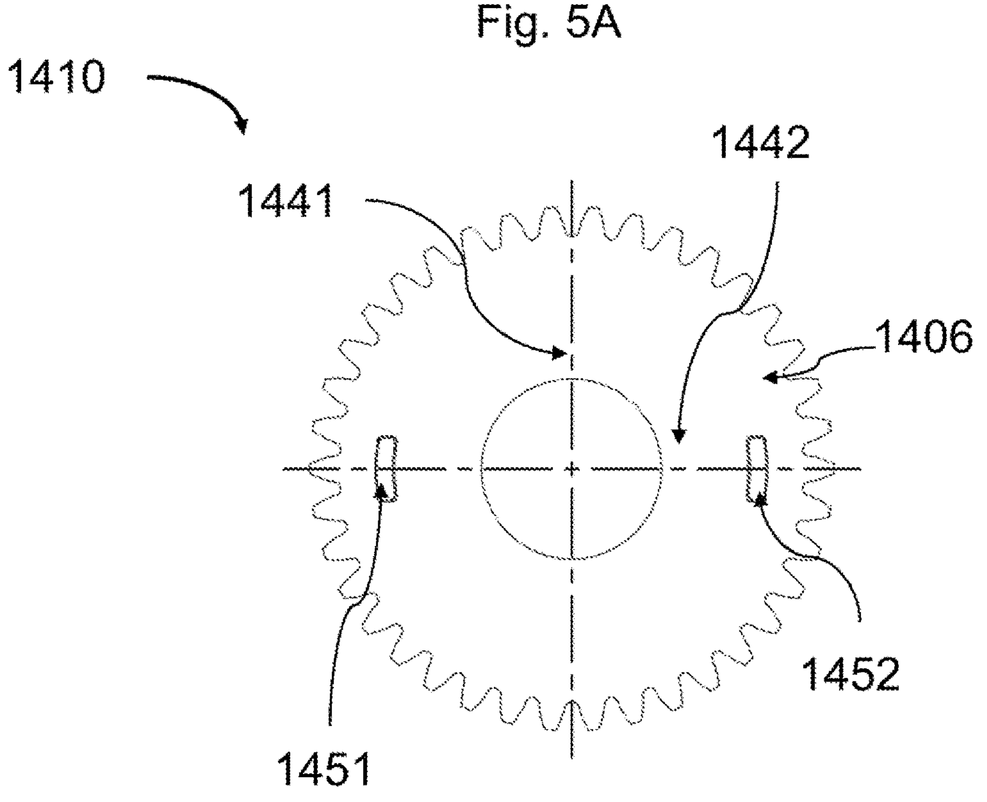
FIG. 5B is a schematic back view of the gear according to the same exemplary embodiment as shown in FIG. 5A.

FIG. 5A and FIG. 5B show a front view and a back view respectively of a gear 1410 in a gear assembly according to another exemplary embodiment. As shown in FIG. 5A, the first protrusion 1412A and the second protrusion 1412B are symmetrically arranged on two opposite sides of the internal wall 1414 and extend towards the axis center 1402, wherein an imaginary line connecting the first protrusion 1412A to the second protrusion 1412B defines a first gear centerline 1441. As shown in FIG. 5B, the gear 1410 further comprises a first baffle 1451 and a second baffle 1452 (also shown in dashed lines in FIG. 5A) that are symmetrically arranged on the gear rear face 1406, wherein an imaginary line connecting the first baffle 1451 to the second baffle 1452 defines a second gear centerline 1442. In this embodiment, the second gear centerline 1442 is substantially perpendicular to the first gear centerline 1441 and intersects at the axis center 1402. The first baffle 1451 and the second baffle 1452 are configured to be used for determining the orientation of the gear 1410, and the specific operation will be described in more detail below.

Rotatable Shaft

Example 6

Figure 6:
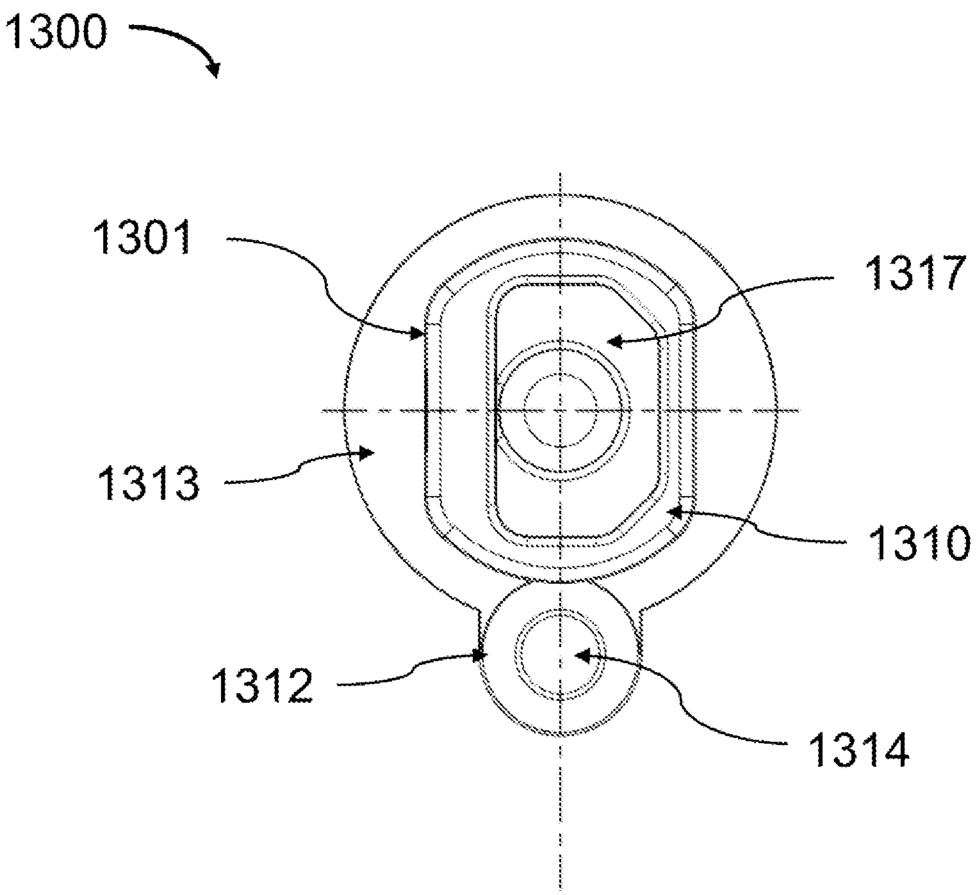
FIG. 6 is a schematic diagram of a rotatable-shaft front end according to an exemplary embodiment.

Referring now to FIG. 1A and FIG. 6, the rotatable-shaft front end 1301 of the rotatable shaft 1300 comprises a slot 1317 which is sized and shaped to be fixedly connected to the knob 1102. In this embodiment, the annular flange 1313 is arranged around the rotatable shaft sleeve 1310. The rotatable shaft sleeve 1310 comprises a protruding portion 1312 substantially perpendicular to the longitudinal axis 1303 (FIG. 1A) and extending away from the rotatable shaft 1300 from the annular flange 1313. The protruding portion 1312 comprises a magnet 1314 disposed thereon, which can be configured to be used for determining the orientation of the rotatable shaft 1300, and the specific operation will be described in detail below. In this embodiment, the magnet 1314 is generally disc-shaped. In some embodiments, the magnet 1314 may be made of a magnetic metal or an alloy. In other embodiments, the magnet 1314 and the protruding portion 1312 each may be in any other shape, such as a rectangular.

Circuit Board

Example 7

Figure 7:
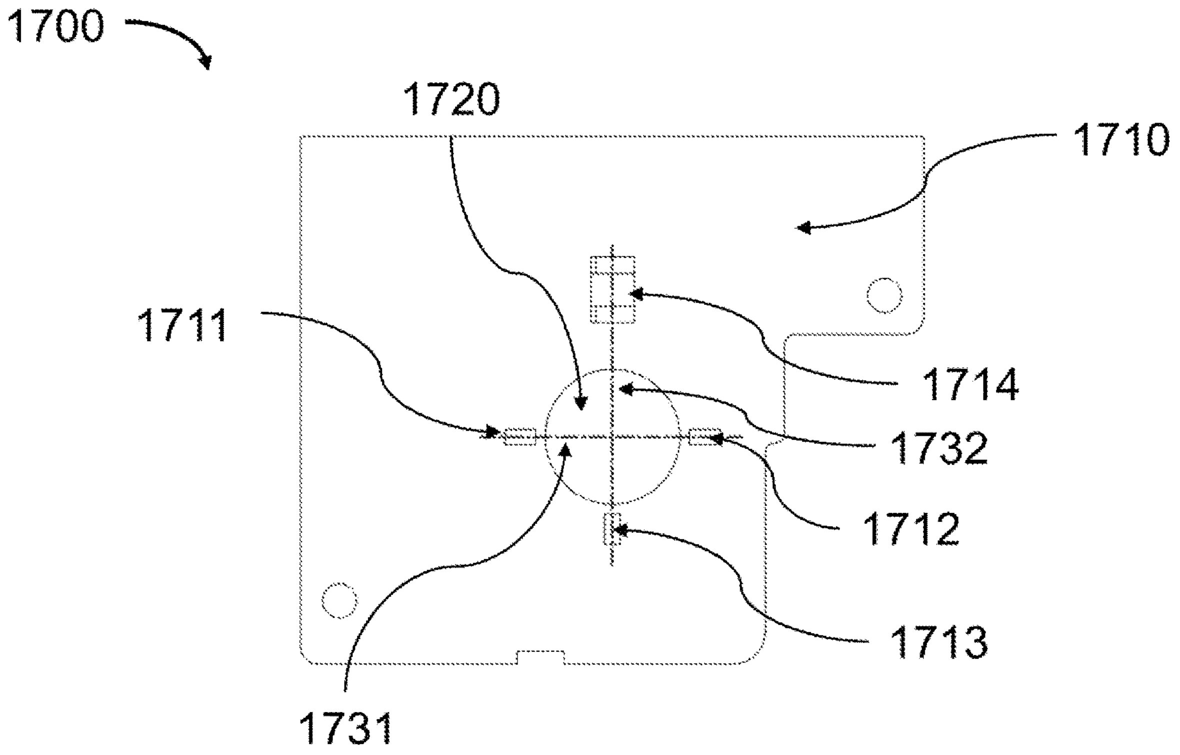
FIG. 7 is a schematic front view of a circuit board according to an exemplary embodiment.

Referring now to FIG. 7, a circuit board front face 1710 of the circuit board 1700 is shown. As described in FIG. 1A, the electric lock 1000 optionally comprises a circuit board 1700, which comprises a circuit board opening 1720. In this embodiment, the circuit board 1700 has a first sensor 1711, a second sensor 1712, a third sensor 1713, and a fourth sensor 1714 that are arranged on the circuit board front face 1710 and around the circuit board opening 1720. The first sensor 1711 and the second sensor 1712 are symmetrically arranged on the circuit board 1700 with the circuit board opening 1720 as a basic center, wherein an imaginary line connecting the first sensor 1711 and the second sensor 1712 defines a first circuit board centerline 1731. The third sensor 1713 and the fourth sensor 1714 are symmetrically arranged on the circuit board 1700 with the circuit board opening 1720 as a basic center, wherein a line connecting the third sensor 1713 and the fourth sensor 1714 defines a second circuit board centerline 1732. In this embodiment, the first circuit board centerline 1731 is perpendicular to the second circuit board centerline 1732.

In this embodiment, the first sensor 1711, the second sensor 1712, and the third sensor 1713 are configured to detect the position of the magnet 1314 (as shown in FIG. 6) of the rotatable shaft 1300 in Example 6, so that the circuit board 1700 can determine and control the orientation of the rotatable shaft through the detected position of the magnet, thereby electrically controlling the locking and unlocking of the lock body (the specific operation will be described in more detail below). The fourth sensor 1714 is configured to detect relative positions of the first baffle 1451 and the second baffle 1452 of the gear 1410 in Example 5, so that the circuit board 1700 can determine and control the orientation of the gear through the detected positions of the first baffle and the second baffle, thereby electrically controlling the rotation of the gear (the specific operation will be described in detail below).

In some embodiments, the circuit board 1700 may further comprise a processor (such as a microprocessor) to control and monitor all operations on the electric lock, for example, to send a lock or unlock instruction to a motor assembly. In some embodiments, the circuit board 1700 may further comprise a data memory and/or a transmission medium, etc.

Specific Process of Operating an Electric Lock with a Free Rotation Mechanism

Electric Control Over Locking and Unlocking of an Electric Lock

The specific operation of electric control over locking and unlocking of the above-mentioned electric lock will now be described in detail. For ease of description, the gear assembly 1400, the motor assembly 1500, the rotatable shaft 1300, and the circuit board 1700 are collectively referred to as a free rotation mechanism 7000. FIG. 8A to FIG. 8E illustrate how a gear assembly 1400 (comprising the gear 1410 in Example 5), a motor assembly 1500, a rotatable shaft 1300 (comprising the magnet 1314 in Example 6), and a circuit board 1700 (Example 7) in a free rotation mechanism 7000 according to an exemplary embodiment cooperate in a process of electric control over locking and unlocking. For ease of description, the directions of rotation of the gears are indicated by arrows. Although the gear assembly 1400 in Example 3 is used to describe the exemplary embodiment of a process of electric control over locking and unlocking, any other gear assembly examples may also be applied to a similar process of electric control over locking and unlocking, including but not limited to the gear assembly 2400 in Example 4.

Example 8—Clockwise Locking Process

Figure 8A:
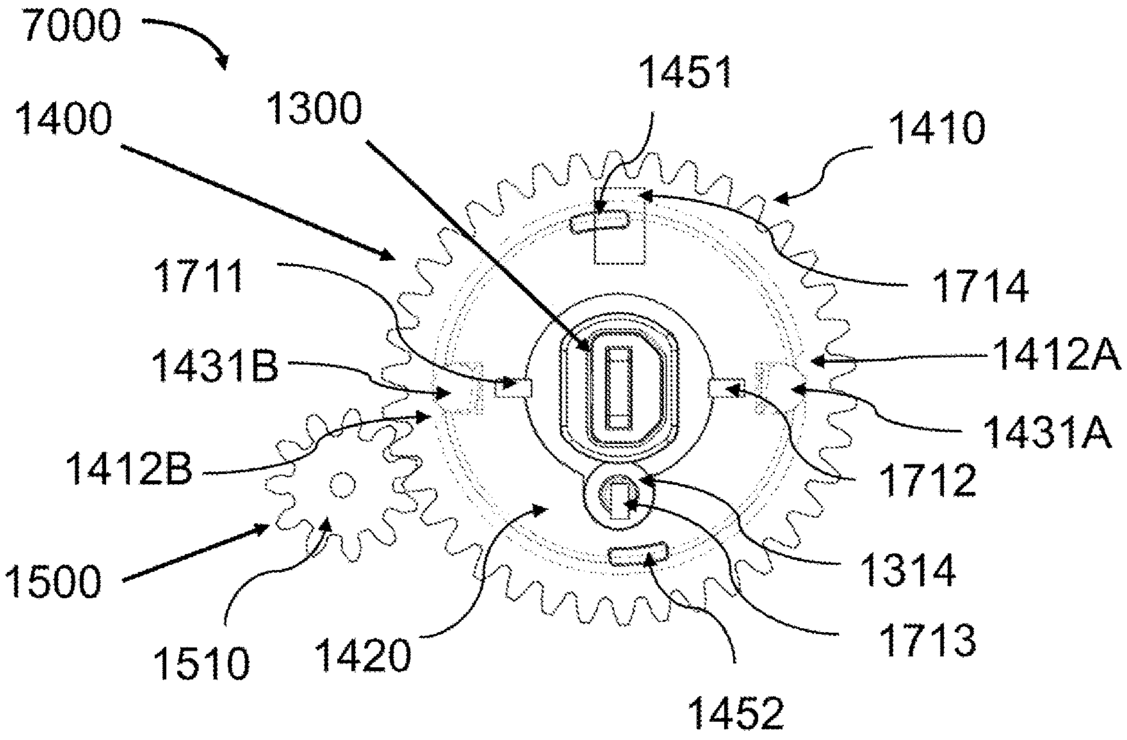
FIG. 8A is a schematic diagram of a free rotation mechanism according to an exemplary embodiment in an unlocked state.
Figure 8B:
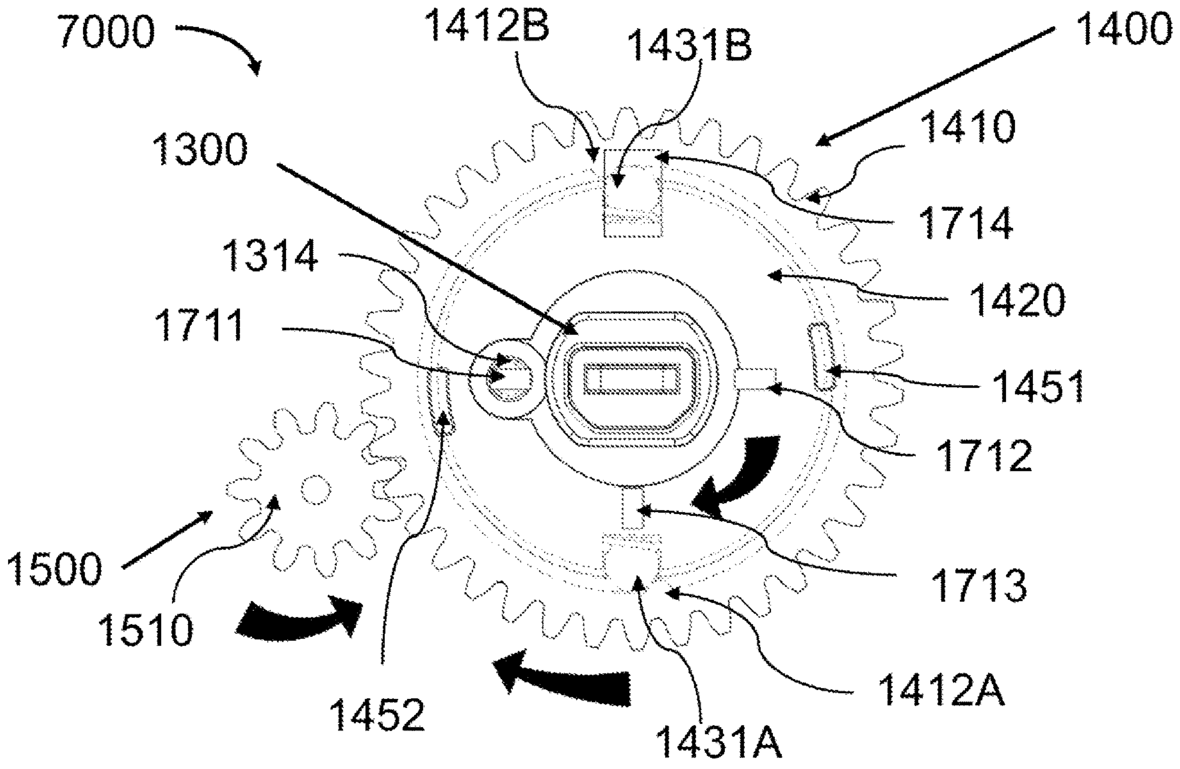
FIG. 8B is a schematic diagram of the free rotation mechanism according to the same exemplary embodiment as shown in FIG. 8A in a locked state (the rotatable shaft rotates by 90° counterclockwise for locking) before a reverse rotation action.
Figure 8C:
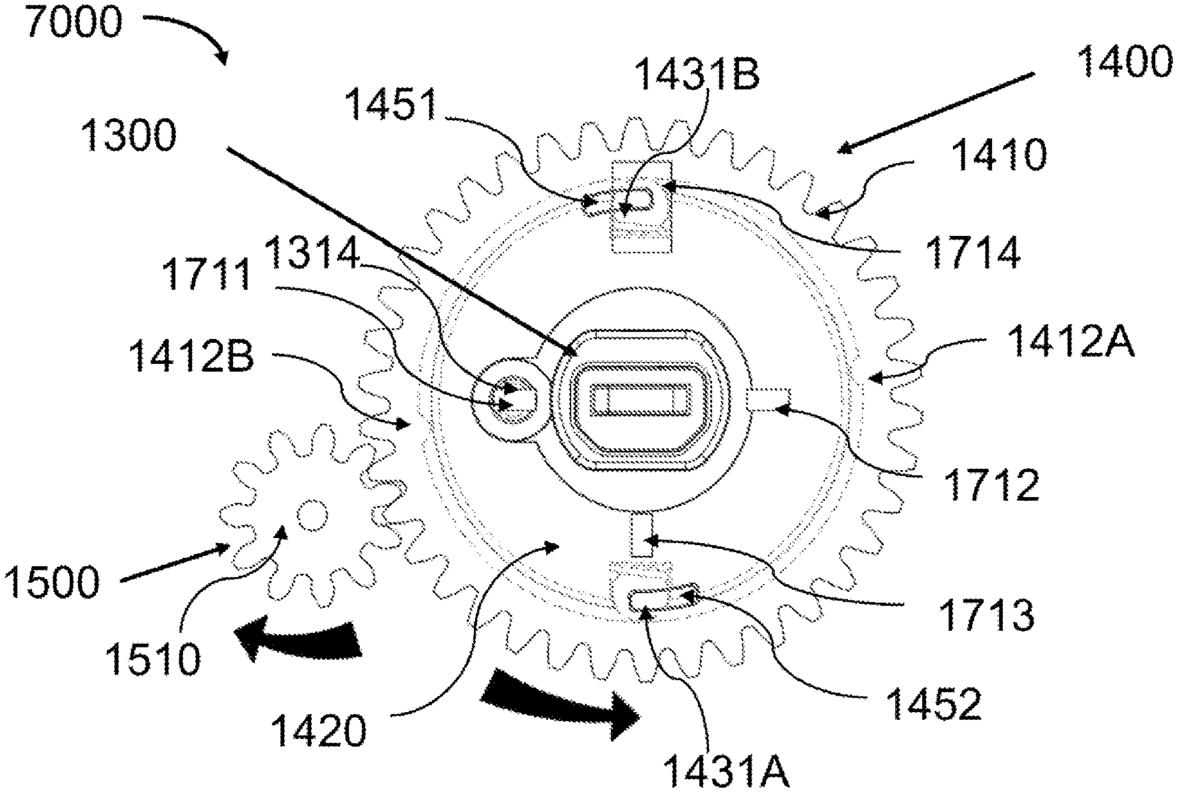
FIG. 8C is a schematic diagram of the free rotation mechanism according to the same exemplary embodiment as shown in FIG. 8A in a locked state (the rotatable shaft rotates by 90° counterclockwise for locking) after the reverse rotation action.

FIG. 8A to FIG. 8C show a locking process in an embodiment in which the rotatable shaft rotates clockwise. As shown in FIG. 8A, when the first baffle 1451 and the fourth sensor 1714 are substantially juxtaposed, and the magnet 1314 and the second sensor 1713 are substantially juxtaposed, the lock body (not shown) is in an unlocked state. After the motor assembly 1500 receives a locking instruction, the motor drives the main gear 1510 to rotate in a counterclockwise direction, so as to drive the gear 1410 to rotate in an opposite clockwise direction, as shown in FIG. 8B. At this point, the first protrusion 1412A and the second protrusion 1412B in the gear 1410 abut beads 1431A and 1431B of the inner core 1420 respectively to form a mutual thrust, so as to drive the inner core 1420 and the rotatable shaft 1300 to rotate clockwise together with the gear 1410. When the first sensor 1711 detects the magnet 1314, the circuit board determines that the locking is in place and instructs the motor assembly 1500 to stop running. At this point, as shown in FIG. 8B, the rotatable shaft 1300 and the inner core 1420 have rotated clockwise by about 90°, so that the lock body is switched from the unlocked state (FIG. 8A) to the locked state (FIG. 8B). Subsequently, the motor assembly 1500 optionally performs a reverse rotation action enabling the main gear 1510 to rotate clockwise, so as to drive the gear 1410 to rotate in the opposite counterclockwise direction; and when the fourth sensor 1714 detects the first baffle 1451, the motor assembly 1500 stops running again. At this point, as shown in FIG. 8C, the gear 1410 has rotated approximately 90° counterclockwise, while the rotatable shaft 1300 and the inner core 1420 remain stationary. Such reverse rotation action allows the inner core 1420 to achieve a free rotation angle of approximately 90° in both clockwise and counterclockwise directions relative to the gear 1410 without the need for the beads 1431A and 1431B to pass over the first protrusion 1421A and the second protrusion 1421B of the gear 1410, so as to facilitate a user's manual control over locking and unlocking of the lock body.

Example 9—Counterclockwise Locking Process

Figure 8D:
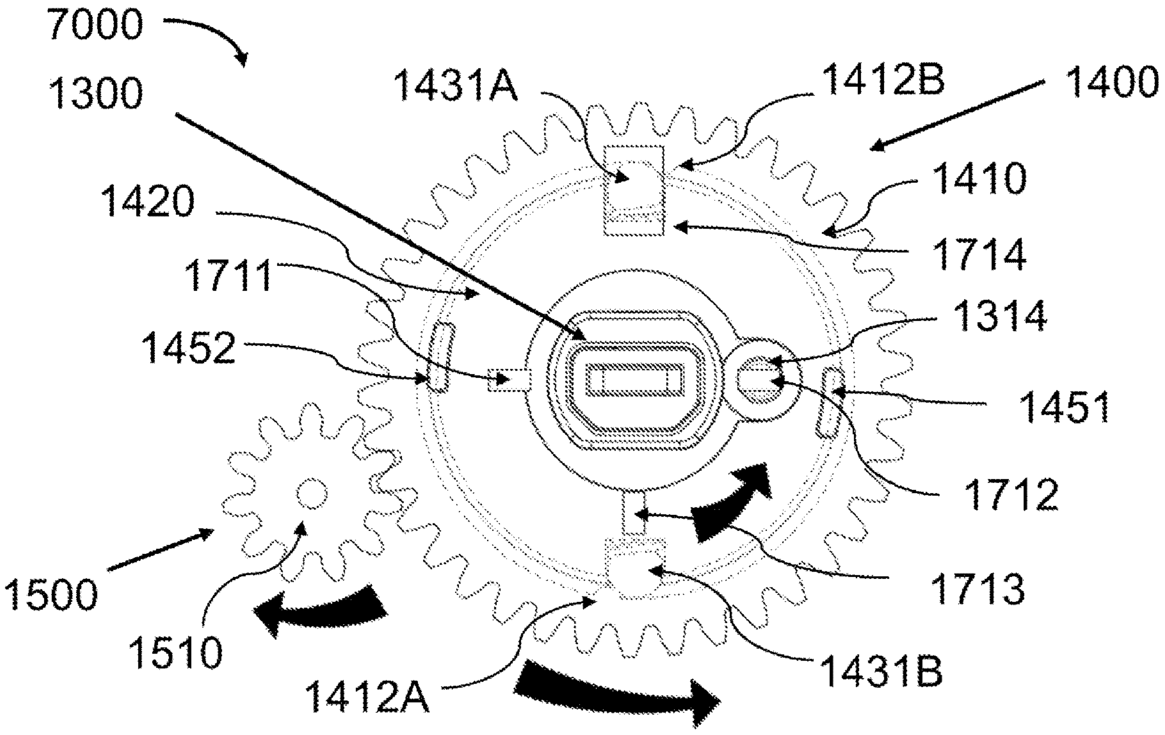
FIG. 8D is a schematic diagram of the free rotation mechanism according to the same exemplary embodiment as shown in FIG. 8A in a locked state (the rotatable shaft rotates by 90° clockwise for locking) before a reverse rotation action.
Figure 8E:
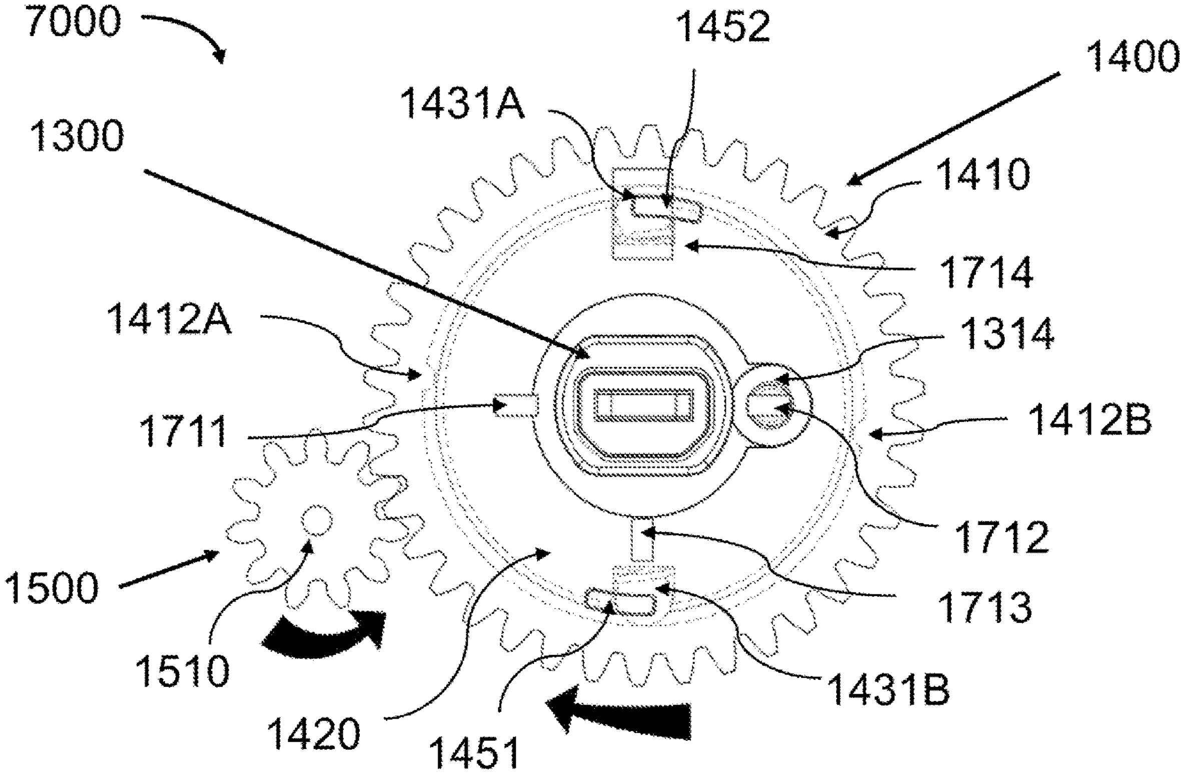
FIG. 8E is a schematic diagram of the free rotation mechanism according to the same exemplary embodiment as shown in FIG. 8A in a locked state (the rotatable shaft rotates by 90° clockwise for locking) after the reverse rotation action.

Now referring to FIG. 8A, FIG. 8D and FIG. 8E together to describe a locking process in another embodiment in which a rotatable shaft rotates counterclockwise. As shown in FIG. 8A, when the first baffle 1451 and the fourth sensor 1714 are substantially juxtaposed, and the magnet 1314 and the second sensor 1713 are substantially juxtaposed, the lock body (not shown) is in an unlocked state. After the motor assembly 1500 receives a locking instruction, the motor drives the main gear 1510 to rotate in a clockwise direction, so as to drive the gear 1410 to rotate in an opposite counterclockwise direction, as shown in FIG. 8D. When the gear 1410 rotates counterclockwise by about 180°, the first protrusion 1412A and the second protrusion 1412B in the gear 1410 abut beads 1431B and 1431A of the inner core 1420 respectively to form a mutual thrust, so as to drive the inner core 1420 and the rotatable shaft 1300 to rotate counterclockwise together with the gear 1410. When the second sensor 1712 detects the magnet 1314, the circuit board determines that the locking is in place and instructs the motor assembly 1500 to stop running. At this point, as shown in FIG. 8D, the rotatable shaft 1300 and the inner core 1420 have rotated counterclockwise by about 90°, so that the lock body is switched from the unlocked state (FIG. 8A) to the locked state (FIG. 8D). Subsequently, the motor assembly 1500 optionally performs a reverse rotation action enabling the main gear 1510 to rotate counterclockwise, so as to drive the gear 1410 to rotate in the opposite clockwise direction; when the fourth sensor 1714 detects the second baffle 1452, the motor assembly 1500 stops running again. At this point, as shown in FIG. 8E, the gear 1410 has rotated approximately 90° clockwise, while the rotatable shaft 1300 and the inner core 1420 remain stationary. Such reverse rotation action allows the inner core 1420 to achieve a free rotation angle of approximately 90° in both clockwise and counterclockwise directions relative to the gear 1410 without the need for the beads 1431A and 1431B to pass over the first protrusion 1421A and the second protrusion 1421B of the gear 1410, so as to facilitate a user's manual control over locking and unlocking of the lock body.

In some embodiments, the electric lock has two locking directions at the same time, namely clockwise locking (as described in Example 8) and counterclockwise locking (as described in Example 9), which improves the practicability of the electric lock.

Example 10—Unlocking Process

In some embodiments, a process opposite to the locking process of Example 8 or Example 9 is an unlocking process. For example, after the locking process of Example 8 is completed, the lock body is in a locked state (as shown in FIG. 8C). After the motor assembly 1500 receives an unlocking instruction, the motor drives the main gear 1510 to rotate in a clockwise direction, so as to drive the gear 1410 to rotate in an opposite counterclockwise direction. When the gear 1410 rotates counterclockwise by about 90°, the first protrusion 1412A and the second protrusion 1412B in the gear 1410 abut beads 1431B and 1431A of the inner core 1420 respectively to form a mutual thrust, so as to drive the inner core 1420 and the rotatable shaft 1300 to rotate counterclockwise together with the gear 1410. When the third sensor 1713 detects the magnet 1314 and when the fourth sensor 1714 detects the first baffle 1451, the circuit board determines that the locking is in place and instructs the motor assembly 1500 to stop running. At this point, as shown in FIG. 8A, both the rotatable shaft 1300 and the inner core 1420 have rotated counterclockwise by about 90°, so that the lock body is switched from the locked state (FIG. 8D) to the unlocked state (FIG. 8A).

In some other embodiments, a process opposite to the process of Example 8 or Example 9 may also be used as an unlocking process of the electric lock.

Manual Operation on Locking and Unlocking of an Electric Lock

Example 11

Figure 9A:
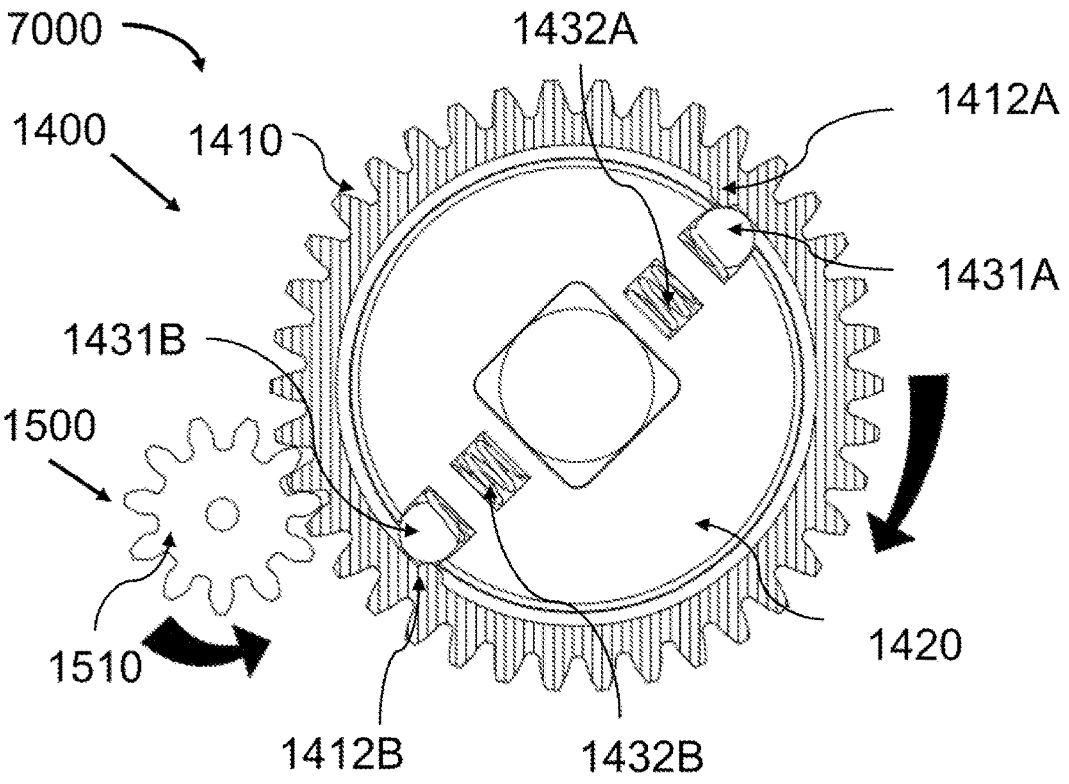
FIG. 9A is a schematic diagram of a gear assembly and a main gear of a motor assembly of a free rotation mechanism according to an exemplary embodiment in a state where they are stopped halfway during electric control.
Figure 9B:
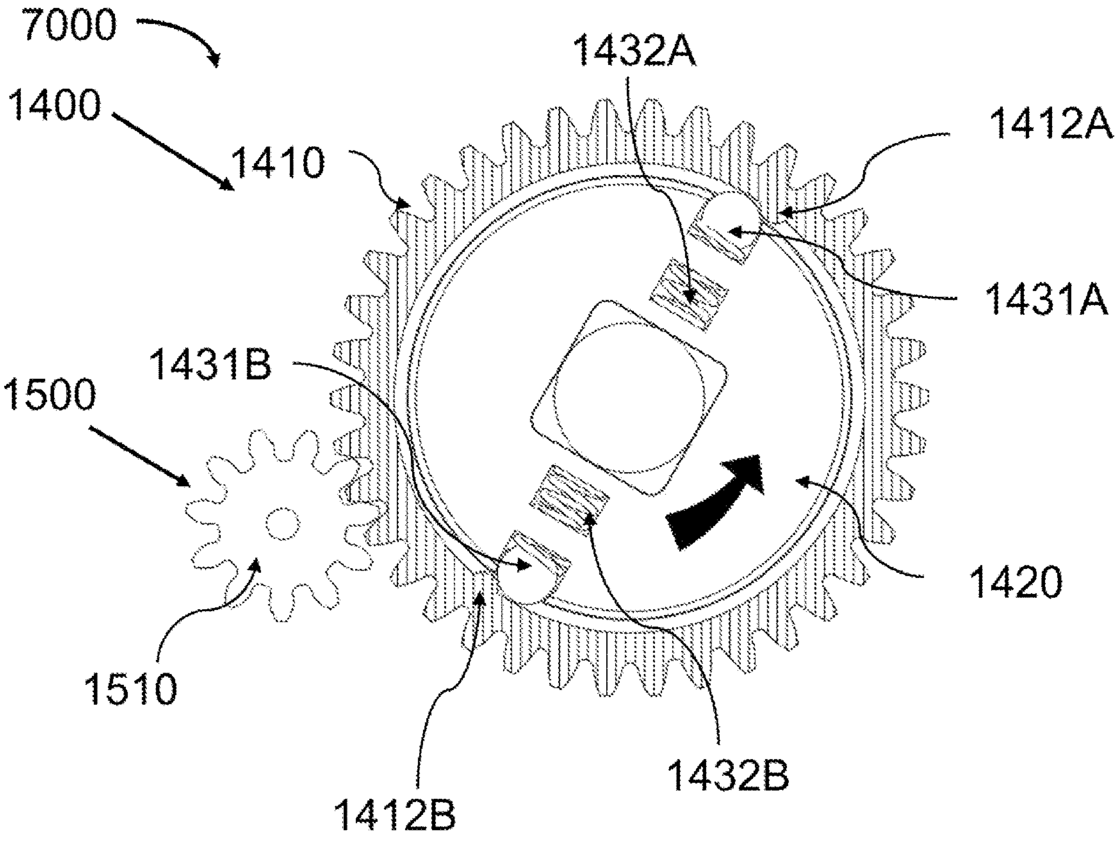
FIG. 9B is a schematic diagram of the gear assembly and the main gear of the motor assembly of the free rotation mechanism according to the same exemplary embodiment as shown in FIG. 9A in a state where they are stopped halfway during electric control, after a ball head of an inner core passes over a protrusion when a sufficient rotational force is applied to a knob.

FIG. 9A and FIG. 9B illustrate specific operations in an embodiment on manual control over locking and unlocking of the above-mentioned electric lock. As shown in FIG. 9A, in this embodiment, the main gear 1510 in the free rotation mechanism 7000 is rotating in the counterclockwise direction as driven by the motor, thereby driving the gear 1410 to rotate in the opposite clockwise direction. In the state of stopping halfway during the electric control (for example, when the motor assembly 1500 stops running, power failure suddenly occurs halfway during electric locking or unlocking or a locked rotor during locking occurs), the main gear 1510 of the motor assembly 1500 will be immobilized, and thus preventing the gear 1410 from performing any rotation in the clockwise and counterclockwise directions. In this case, a user can manually rotate a knob (not shown) to drive the inner core 1420 to rotate in the counterclockwise direction. Under the conditions that the beads 1431A and 1431B of the inner core 1420 abut the first protrusion 1412A and the second protrusion 1412B respectively (as shown in FIG. 9A), when a user applies a sufficient rotational force to the knob (not shown) in a counterclockwise direction to offset a mutual thrust between the first protrusion 1412A and the bead 1431A, the first spring 1432A and the second spring 1432B can be compressed, so that the beads 1431A and 1431B pass over the first protrusion 1412A and the second protrusion 1412B respectively, as shown in FIG. 9B. In this case, the inner core 1420 has a free rotation space of approximately 180° in the counterclockwise direction relative to the gear 1410, without the need to pass over the first protrusion 1421A and the second protrusion 1421B again, thereby allowing a user to manually control locking and unlocking of the lock body (not shown). In some other embodiments, the inner core 1420 can freely pass over the first protrusion 1421A and the second protrusion 1421B in the clockwise and counterclockwise directions, therefore the inner core 1420 can actually freely rotate by 360° relative to the gear 1410 without being constrained by the gear 1410. In some embodiments, since the knob (not shown) can drive the inner core 1420 and the rotatable shaft (not shown) to rotate independently of the gear 1410, the user can manually perform locking and unlocking operations without the need to turn the knob with a great force. This enables the user to easily perform manual locking or unlocking, which significantly improves the safety and practicality of the electric lock.

Example 12

Figure 10A:
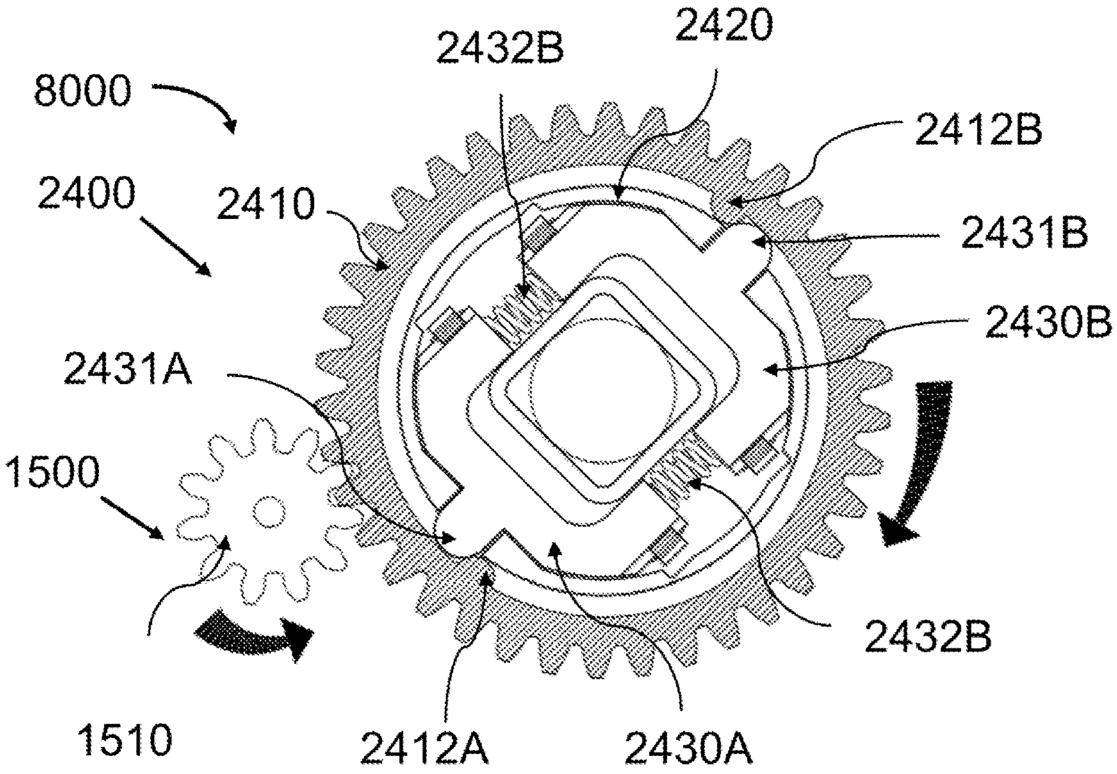
FIG. 10A is a schematic diagram of a gear assembly and a main gear of a motor assembly of a free rotation mechanism according to another exemplary embodiment in a state where they are stopped halfway during electric control.
Figure 10B:
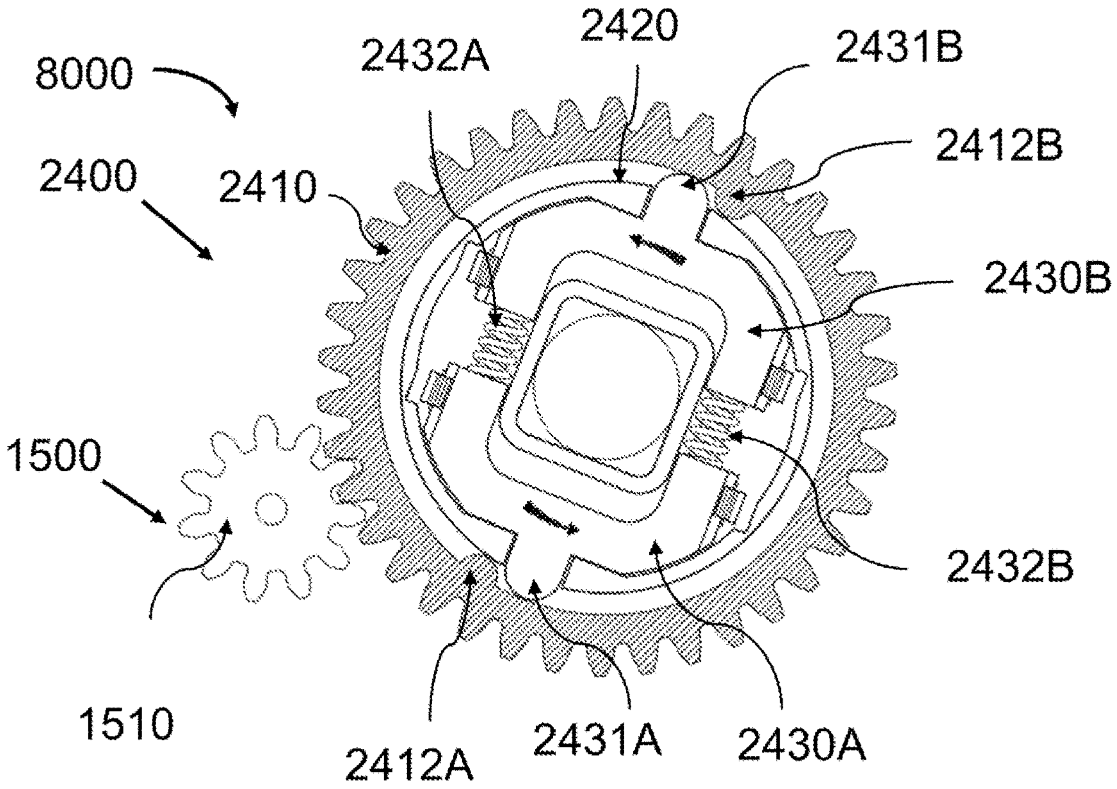
FIG. 10B is a schematic diagram of the gear assembly and the main gear of the motor assembly of the free rotation mechanism according to the same exemplary embodiment as shown in FIG. 10A in a state where they are stopped halfway during electric control, after a ball head of an inner core passes over a protrusion when a sufficient rotational force is applied to a knob.

FIG. 10A and FIG. 10B illustrate specific operations in another embodiment on manual control over locking and unlocking of the electric lock. In this embodiment, a free rotation mechanism 8000 comprises a gear assembly 2400 as described in Example 4 and a motor assembly 1500. As shown in FIG. 10A, in this embodiment, the main gear 1510 in the free rotation mechanism 8000 is rotating in the counterclockwise direction as driven by the motor, thereby driving the gear 2410 to rotate in the opposite clockwise direction. In the state of stopping halfway during the electric control (for example, when the motor assembly 1500 stops running, power failure suddenly occurs halfway during electric locking or unlocking or a locked rotor during locking occurs), the main gear 1510 of the motor assembly 1500 will be immobilized, and thus preventing the gear 2410 from performing any rotation in the clockwise and counter-clockwise directions. In this case, a user can manually rotate a knob (not shown) to drive the inner core 2420 to rotate in the counterclockwise direction. Under the conditions that the first ball head 2431A of the first frame 2430A and the second ball head 2431B of the second frame 2430B abut the first protrusion 2412A and the second protrusion 2412B respectively (as shown in FIG. 10A), when a user applies a sufficient rotational force to the knob (not shown) in a counterclockwise direction to offset a mutual thrust between the first protrusion 2412A and the second protrusion 2412B and the respective first ball head 2431A and the second ball head 2431B, the first spring 2432A and the second spring 2432B can be compressed, so that the first frame 2430A and the second frame 2430B approach each other, so that the first ball head 2431A and the second ball head 2431B pass over the first protrusion 2412A and the second protrusion 2412B respectively, as shown in FIG. 10B. In this case, the inner core 2420 has a free rotation space of approximately 180° in the counterclockwise direction relative to the gear 2410, without the need to pass over the first protrusion 2421A and the second protrusion 2421B again, thereby allowing a user to manually control locking and unlocking of the lock body (not shown). In some other embodiments, the inner core 2420 can freely pass over the first protrusion 2421A and the second protrusion 2421B in the clockwise and counterclock-wise directions, therefore the inner core 2420 can actually freely rotate by 360° relative to the gear 2410 without being constrained by the gear 2410.

The preferred embodiments of the present invention are described above with reference to the accompanying figures, and the scope of the present invention is not limited thereby. Those skilled in the art can implement the present invention in many variation solutions without departing from the scope and essence of the present invention. For example, features of one embodiment can be used in another embodiment to obtain a further embodiment. Any modifications, equivalent replacements and improvements made within the technical conception of the present invention shall fall within the scope of the present invention.

For example, the rotatable shaft described in Example 1 is composed of two separate components (the rotatable shaft sleeve and the shaft body). In other embodiments, the rotatable shaft may not have a rotatable shaft sleeve, and be composed of only an integral component. In still some other embodiments, the rotatable shaft may be composed of more than two or more components.

For example, in Example 1, the shaft body is substantially rectangular, but it can also be in other shapes, such as cylindrical, polygonal, irregular shape etc.

For example, in Example 1, the knob has a substantially circular outer periphery, but it can also be in other shapes, such as square, rhombus, ellipse, polygon, irregular shape etc.

For example, in Example 1, the outer periphery of the gear internal space and the gear opening are substantially circular, but they can also be in other shapes, such as square, rhombus, ellipse, polygon, irregular shape etc.

For example, in Example 2, the inner core opening and the outer periphery of the connecting column may have a shape of a square with substantially the same size and shape, but they may also be in other shapes with substantially the same size and shape, such as circle, rhombus, ellipse, polygon, irregular shape etc.

For example, in the examples above, the inner core comprises two ball head spring mechanisms disposed on the inner core and the internal wall of the gear comprises two corresponding protrusions. However, in some other embodiments, the inner core may have only one ball head spring mechanism, and the internal wall of the gear comprises one corresponding protrusion. In some other embodiments, the inner core may have three, four or more ball head spring mechanisms, and the internal wall of the gear comprises a corresponding number of protrusions. In some other embodiments, the three, four or more ball head spring mechanisms and the corresponding number of protrusions may be equidistantly arranged on the inner core and the internal wall of the gear respectively.

For example, in some embodiments, the number of the ball head spring mechanisms of the inner core may be the same as the number of protrusions on the internal wall of the gear. In some other embodiments, the number of the ball head spring mechanisms of the inner core may be different from the number of protrusions on the internal wall of the gear. For example, in an embodiment, the inner core may have one ball head spring mechanism, and the internal wall of the gear may have two protrusions. In another embodiment, the inner core may have two ball head spring mechanisms, and the internal wall of the gear may have one protrusion.

For example, in the examples above, a mechanical barrier is a protrusion disposed on the internal wall of the gear. However, in some other embodiments, the mechanical barrier may be an obstacle in any other form that can restrict or hinder the passage of the movable piece therefrom, including but not limited to a stopper, a ridge, a bump, and a bulge.

For example, in the examples above, the spring may be helical, but it can also be of any other shape, size, material, or form that can provide an elastic force.

For example, in the examples above, the ball head spring mechanism is composed of a spring and a bead. However, in some other embodiments, the ball head spring mechanism may be composed of multiple other components, or composed of only one integral component. For example, the ball head spring mechanism may comprise any element with an elastic force other than a spring, including but not limited to an elastic band, a rubber band, and an elastic glue. For example, the ball head spring mechanism may comprise any element with a round head other than a bead, including but not limited to a bullet head, a round head cylinder, or a round head screw.

For example, in the examples above, the first frame and the second frame are elastically connected to each other by a spring. However, in some other embodiments, the first frame and the second frame may be elastically connected to each other in other ways. For example, the first frame and the second frame may be elastically connected to each other via any element with an elastic force other than a spring, including but not limited to an elastic band, a rubber band, and elastic glue.

For example, in some embodiments, the sensor may be a magnetic sensor. However, in some other embodiments, the sensor may be another type of sensors, including but not limited to a photoelectric sensor, a photocoupler, a Hall sensor, a detection switch and a touch switch. In some embodiments, the first sensor, the second sensor, the third sensor, and the fourth sensor are all sensors of the same type. In some other embodiments, at least one of the first sensor, the second sensor, the third sensor, and the fourth sensor may be a sensor of a different type from the remaining sensors. For example, the first sensor, the second sensor and the third sensor may be photocouplers, and the fourth sensor may be a Hall sensor.

What is claimed is:

1. An electric lock, comprising:
(a) a knob;
(b) a lock body;
(c) a rotatable shaft comprising a rotatable-shaft front end and an opposing rotatable-shaft rear end, wherein the rotatable-shaft rear end is fixedly connected to the lock body to control a locking and unlocking of the lock body;
(d) a gear assembly comprising a gear and an inner core with a common axis center; and
(e) a motor assembly for driving the gear to rotate;
wherein
the gear comprises an internal wall that defines a gear internal space for accommodating the inner core, wherein the internal wall comprises at least one protrusion extending towards the axis center;
the inner core is at least partially mounted in the gear internal space, wherein the inner core comprises an inner core opening arranged on the axis center and at least one rounded head spring mechanism provided in the inner core, and the at least one rounded head spring mechanism comprises a rounded head extending away from the axis center and adjacent to the internal wall;
the electric lock further comprises a connector comprising a connector front end, an opposing connector rear end, and a connector outer periphery sized and shaped to match the inner core opening, wherein the connector front end is connected to the knob, and the connector rear end passes through the inner core opening and is connected to the rotatable-shaft front end;
wherein when the motor assembly drives the gear to rotate, the at least one protrusion interacts with the at least one rounded head spring mechanism to drive the inner core and the rotatable shaft to rotate together, thereby electrically controlling the locking and unlocking of the lock body; and
the at least one rounded head spring mechanism is compressible, such that when a sufficient manual rotational force is applied to the knob, the rounded head passes over the at least one protrusion, so that the inner core is free to rotate relative to the gear, thereby allowing a user to manually control the locking and unlocking of the lock body.

2. The electric lock of claim 1, wherein the inner core comprises at least one recess arranged on the inner core and configured to accommodate one of the at least one rounded head spring mechanism.

3. The electric lock of claim 1, wherein the gear comprises a gear opening arranged on the axis center, wherein a size of the gear opening is larger than that of the inner core opening, so that when the knob is manually rotated, the knob drives the inner core and the rotatable shaft to rotate independently of the gear.

4. The electric lock of claim 1, wherein the motor assembly comprises a main gear meshing with the gear to drive the gear to rotate.

5. The electric lock of claim 1, wherein
the at least one protrusion is-comprises two protrusions symmetrically arranged on two opposite sides of the internal wall and extending towards the axis center; and
the at least one rounded head spring mechanism comprises two rounded head spring mechanisms.

6. The electric lock of claim 1, wherein the rounded head of the at least one rounded head spring mechanisms is a bead, a bullet head, a round head cylinder, or a round head screw.

7. The electric lock of claim 1, wherein
the rotatable-shaft front end and the rotatable-shaft rear end define a longitudinal axis therebetween, and the rotatable-shaft front end comprises a protruding portion extending substantially perpendicular to the longitudinal axis and away from the rotatable shaft, the protruding portion comprises a magnet disposed thereon; and
the electric lock further comprises a circuit board electrically connected to the motor assembly, the circuit board is arranged substantially perpendicular to the longitudinal axis and comprises a circuit board opening to allow the rotatable-shaft rear end to pass through the circuit board opening so as to be fixedly connected to the lock body, and the circuit board further comprises a first sensor, a second sensor, and a third sensor for detecting the position of the magnet, such that the circuit board determines and controls the orientation of the rotatable shaft through the detected position of the magnet, thereby electrically controlling the locking and unlocking of the lock body.

8. The electric lock of claim 7, wherein
the gear further comprises a gear front face facing the knob and an opposing gear rear face, and a first baffle and a second baffle symmetrically arranged on the gear rear face; and
the circuit board further comprises a fourth sensor for detecting the first baffle and the second baffle, such that the circuit board determines and controls the orientation of the gear through detected positions of the first baffle and the second baffle, thereby electrically controlling the rotation of the gear.

9. The electric lock of claim 8, wherein
the first sensor and the second sensor are symmetrically arranged on the circuit board with the circuit board opening as a center, wherein a line connecting the first sensor and the second sensor defines a first circuit board centerline; and
the third sensor and the fourth sensor are symmetrically arranged on the circuit board with the circuit board opening as a center and aligned along a second circuit board centerline perpendicular to the first circuit board centerline.

10. The electric lock of claim 8, further comprising a front cover and a rear cover, wherein the front cover is connected to the rear cover to form a housing and define a housing internal space therein, wherein the gear assembly, the motor assembly, the circuit board and at least part of the rotatable shaft are arranged within the housing internal space, and the knob and the lock body are arranged outside the housing internal space.

11. The electric lock of claim 10, wherein the knob is mounted on the front cover and fixed by a circlip, and the circuit board is mounted on the rear cover and faces the housing internal space.

12. The electric lock of claim 1, wherein the inner core is free to rotate by 360° relative to the gear.

13. An electric lock, comprising:

(a) a knob;

(b) a lock body;

(c) a rotatable shaft comprising a rotatable-shaft front end and an opposing rotatable-shaft rear end, wherein the rotatable-shaft rear end is fixedly connected to the lock body to control a locking and unlocking of the lock body;

(d) a gear assembly comprising a gear and a movable piece with a common axis center; and (e) a motor assembly for driving the gear to rotate;

wherein the knob and the rotatable shaft are connected via the movable piece;

the movable piece interacts with the gear via a mechanical barrier, such that electrically driving the gear by the motor assembly causes the movable piece to rotate;

the movable piece passes over the mechanical barrier when a sufficient manual rotational force is applied to the knob, such that the movable piece is free to rotate relative to the gear, thereby allowing a user to manually control the locking and unlocking of the lock body, the gear comprises an internal wall that defines a gear internal space for accommodating the movable piece, wherein the mechanical barrier comprises at least one protrusion extending from the internal wall towards the axis center;

the movable piece comprises at least one rounded head spring mechanism, and the at least one rounded head spring mechanism comprises a rounded head extending away from the axis center and adjacent to the internal wall; and the at least one rounded head spring mechanism is compressible, such that when the sufficient manual rotational force is applied to the knob, the rounded head passes over the at least one protrusion.

14. The electric lock of claim 13, wherein the movable piece comprises at least one recess arranged on the movable piece and configured to accommodate the at least one rounded head spring mechanism.

15. The electric lock of claim 13, wherein the at least one protrusion comprises two protrusions symmetrically arranged on two opposite sides of the internal wall and extending towards the axis center; and the at least one rounded head spring mechanism comprises two rounded head spring mechanisms.

16. The electric lock of claim 13, wherein the gear comprises an internal wall that defines a gear internal space for accommodating the movable piece, wherein the mechanical barrier comprises two protrusions extending from the internal wall towards the axis center; and the movable piece is at least partially mounted in the gear internal space, wherein the movable piece comprises two frames disposed therein, and each of the two frames comprises a rounded head disposed thereon;

wherein the rounded head extends away from the axis center, and each of the two frames is elastically connected to an adjacent one of the two frames, such that the rounded head abuts the internal wall, and when the sufficient manual rotational force is applied to the knob, the two frames approach each other, such that the rounded head passes over the two protrusions.

17. The electric lock of claim 16, wherein the rounded heads and the axis center define a radial axis therebetween; and the electric lock further comprises at least one restricting member, and the at least one restricting member is configured to hold the two frames and restrict the rounded heads to move along the radial axis.

18. The electric lock of claim 17, wherein each of the two frames comprises at least one guide rail, which is configured to be placed juxtapose with the at least one restricting member and restrict the two frames to move along the radial axis.

19. The electric lock of claim 16, wherein the two frames comprise:

(i) a first frame, wherein the rounded head of the first frame is a first rounded head disposed on the first frame, wherein the first rounded head extends away from the axis center and abuts the internal wall; and a first arm and a second arm;

(ii) a second frame, wherein the second frame and the first frame are symmetrically arranged on the movable piece, the rounded head of the second frame is a second rounded head disposed on the second frame, wherein the second rounded head extends away from the axis center and abuts the internal wall; and a third arm and a fourth arm;

the movable piece further comprises:

a first spring elastically connecting the first arm of the first frame to the third arm of the second frame; and a second spring elastically connecting the second arm of the first frame to the fourth arm of the second frame.

20. The electric lock of claim 13, wherein the movable piece comprises a movable piece opening arranged on the axis center, wherein the gear comprises a gear opening arranged on the axis center, wherein a size of the gear opening is larger than that of the movable piece opening, so that when the knob is manually rotated, the knob drives the movable piece and the rotatable shaft to rotate independently of the gear.

21. The electric lock of claim 13, wherein the motor assembly comprises a main gear meshing with the gear to drive the gear to rotate.

22. The electric lock of claim 13, wherein the rounded heads are beads, bullet heads, round head cylinders, or round head screws.

23. The electric lock of claim 13, wherein the rotatable-shaft front end and the rotatable-shaft rear end define a longitudinal axis therebetween, and the rotatable-shaft front end comprises a protruding portion extending substantially perpendicular to the longitudinal axis and away from the rotatable shaft, the protruding portion comprises a magnet disposed thereon; and the electric lock further comprises a circuit board electrically connected to the motor assembly, the circuit board is arranged substantially perpendicular to the longitudinal axis and comprises a circuit board opening to allow the rotatable-shaft rear end to pass through the circuit board opening so as to be fixedly connected to the lock body, and the circuit board further comprises a first sensor, a second sensor, and a third sensor for detecting the position of the magnet, such that the circuit board determines and controls the orientation of the rotatable shaft through the detected position of the magnet, thereby electrically controlling the locking and unlocking of the lock body.

24. The electric lock of claim 23, wherein the gear further comprises a gear front face facing the knob and an opposing gear rear face, and a first baffle and a second baffle symmetrically arranged on the gear rear face; and the circuit board further comprises a fourth sensor for detecting the first baffle and the second baffle, such that the circuit board determines and controls the orientation of the gear through detected positions of the first baffle and the second baffle, thereby electrically controlling the rotation of the gear.

25. The electric lock of claim 24, wherein the first sensor and the second sensor are symmetrically arranged on the circuit board with the circuit board opening as a center, wherein a line connecting the first sensor and the second sensor defines a first circuit board centerline; and the third sensor and the fourth sensor are symmetrically arranged on the circuit board with the circuit board opening as a center and aligned along a second circuit board centerline perpendicular to the first circuit board centerline.

26. The electric lock of claim 25, further comprising a front cover and a rear cover, wherein the front cover is connected to the rear cover to form a housing and define a housing internal space therein, wherein the gear assembly, the motor assembly, the circuit board and at least part of the rotatable shaft are arranged within the housing internal space, and the knob and the lock body are arranged outside the housing internal space.

27. The electric lock of claim 26, wherein the knob is mounted on the front cover and fixed by a circlip, and the circuit board is mounted on the rear cover and faces the housing internal space.

28. The electric lock of claim 13, wherein the movable piece is free to rotate by 360° relative to the gear.

29. An electric lock, comprising:

(a) a knob;

(b) a lock body;

(c) a rotatable shaft comprising a rotatable-shaft front end and an opposing rotatable-shaft rear end, wherein the rotatable-shaft rear end is fixedly connected to the lock body to control a locking and unlocking of the lock body;

(d) a gear assembly comprising a gear and an inner core with a common axis center; and (e) a motor assembly for driving the gear to rotate;

wherein the gear comprises an internal wall that defines a gear internal space for accommodating the inner core, wherein the internal wall comprises two protrusions extending towards the axis center;

the inner core is at least partially mounted in the gear internal space, wherein the inner core comprises:

(i) an inner core opening arranged on the axis center;

(ii) a first frame, wherein the first frame comprises:

a first rounded head disposed on the first frame, wherein the first rounded head extends away from the axis center and abuts the internal wall; and a first arm and a second arm;

(iii) a second frame, wherein the second frame and the first frame are symmetrically arranged on the inner core, the second frame comprises:

a second rounded head disposed on the second frame, wherein the second rounded head extends away from the axis center and abuts the internal wall; and a third arm and a fourth arm;

(iv) a first spring elastically connecting the first arm of the first frame to the third arm of the second frame; and (v) a second spring elastically connecting the second arm of the first frame to the fourth arm of the second frame;

the electric lock further comprises a connector comprising a connector front end, an opposing connector rear end, and a connector outer periphery sized and shaped to match the inner core opening, wherein the connector front end is connected to the knob, and the connector rear end passes through the inner core opening and is connected to the rotatable-shaft front end;

wherein when the motor assembly drives the gear to rotate, the two protrusions interact with the first frame and the second frame respectively to drive the inner core and the rotatable shaft to rotate together, thereby electrically controlling the locking and unlocking of the lock body; and the first spring and the second spring are compressible, such that when a sufficient manual rotational force is applied to the knob, the first frame and the second frame approach each other so that the first rounded head and the second rounded head pass over one of the two protrusions respectively, so that the inner core is free to rotate relative to the gear, thereby allowing a user to manually control the locking and unlocking of the lock body.

30. The electric lock of claim 29, wherein the first rounded head and the axis center define a first radial axis therebetween, and the second rounded head and the axis center define a second radial axis therebetween; and the electric lock further comprises:

a first restricting member and a second restricting member, configured to hold the first frame and restrict the first rounded head to move along the first radial axis; and a third restricting member and a fourth restricting member, configured to hold the second frame and restrict the second rounded head to move along the second radial axis.

31. The electric lock of claim 30, wherein the first arm of the first frame comprises a first guide rail;

the second arm of the first frame comprises a second guide rail;

the third arm of the second frame comprises a third guide rail;

the fourth arm of the second frame comprises a fourth guide rail;

wherein the first restricting member and the second restricting member are placed juxtapose with the first guide rail and the second guide rail respectively and restrict the first frame to move along the first radial axis; and the third restricting member and the fourth restricting member are placed juxtapose with the third guide rail and the fourth guide rail respectively and restrict the second frame to move along the second radial axis.

* * * * *